United States Patent [19]
Gudmestad

[11] 3,789,485
[45] Feb. 5, 1974

[54] METHOD AND APPARATUS FOR PRODUCING FLEXIBLE FIBER OPTICAL LIGHT CONDUCTORS

[75] Inventor: Ragnar Gudmestad, West Allis, Wis.

[73] Assignee: Artos Engineering Company, New Berlin, Wis.

[22] Filed: Jan. 24, 1973

[21] Appl. No.: 326,380

[52] U.S. Cl. .............................. 29/203 D, 29/630 A
[51] Int. Cl. ......................... H01r 43/04, H01r 9/00
[58] Field of Search...29/203 D, 203 DT, 203 DTS, 29/630 A, 626, 400; 83/151

[56] References Cited
UNITED STATES PATENTS

| | | | |
|---|---|---|---|
| 2,683,924 | 7/1954 | Schryver | 29/203 D |
| 2,768,425 | 10/1956 | Andren | 29/630 A |
| 3,267,556 | 8/1966 | Scharf | 29/203 D |
| 3,456,324 | 7/1969 | Hahn et al. | 20/203 D |
| 3,611,544 | 10/1971 | Frels et al. | 29/407 |
| 3,701,301 | 10/1972 | Gudmestad | 83/151 |

*Primary Examiner*—Thomas H. Eager
*Attorney, Agent, or Firm*—James E. Nilles

[57] ABSTRACT

A stepwise advancing conveyor moves parallel fiber optical ribbons successively sidewise into endwise alignment with a ferrule attaching unit which during short periods of temporary standstill of the conveyor attaches a ferrule to the free end of each successive ribbon. Subsequent advance movement of the conveyor aligns the ribbon and attached ferrule with a cutting unit which trims the ferrule and ribbon end therein so as to provide the ribbon with a plane, light admitting and emitting end face.

21 Claims, 57 Drawing Figures

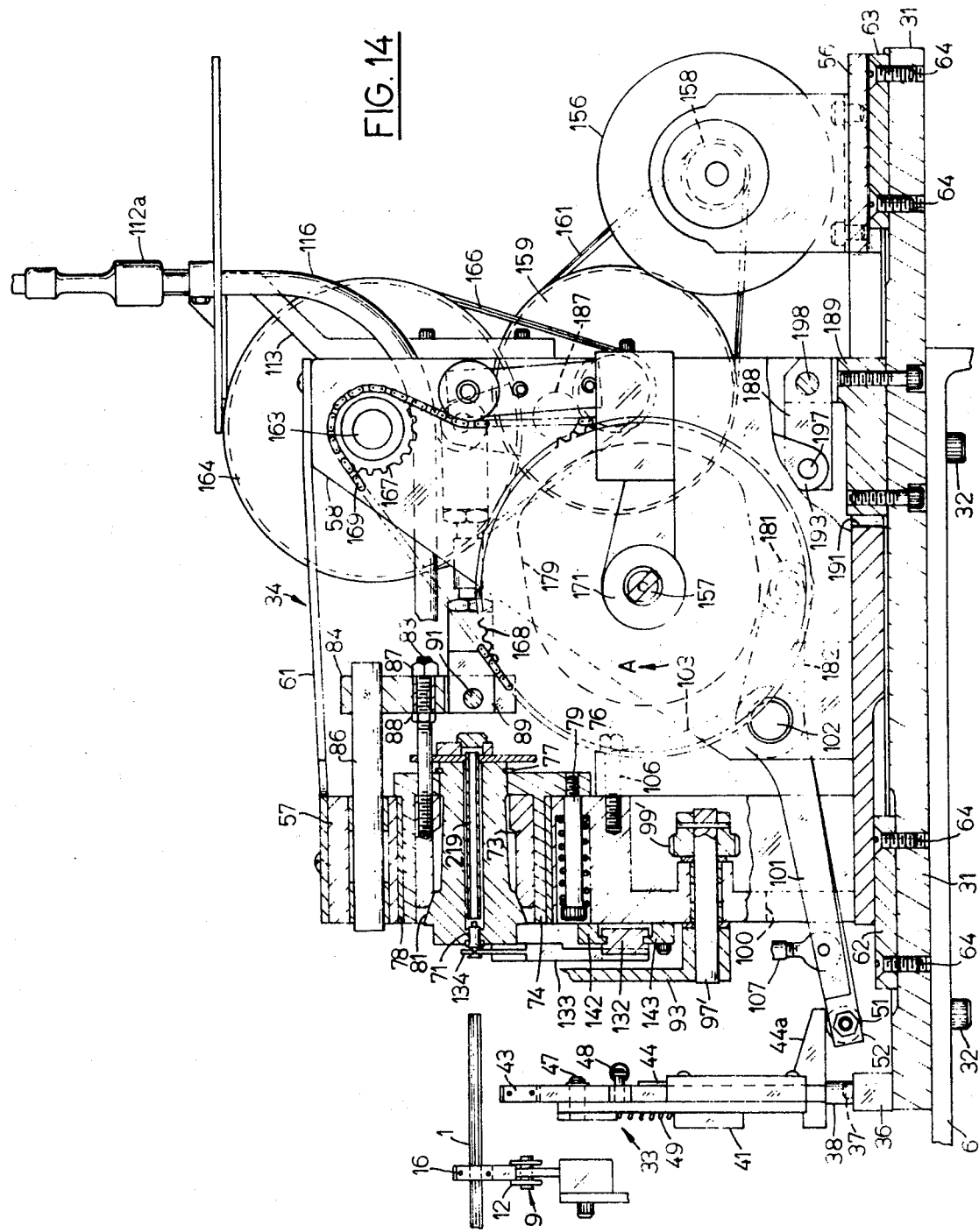

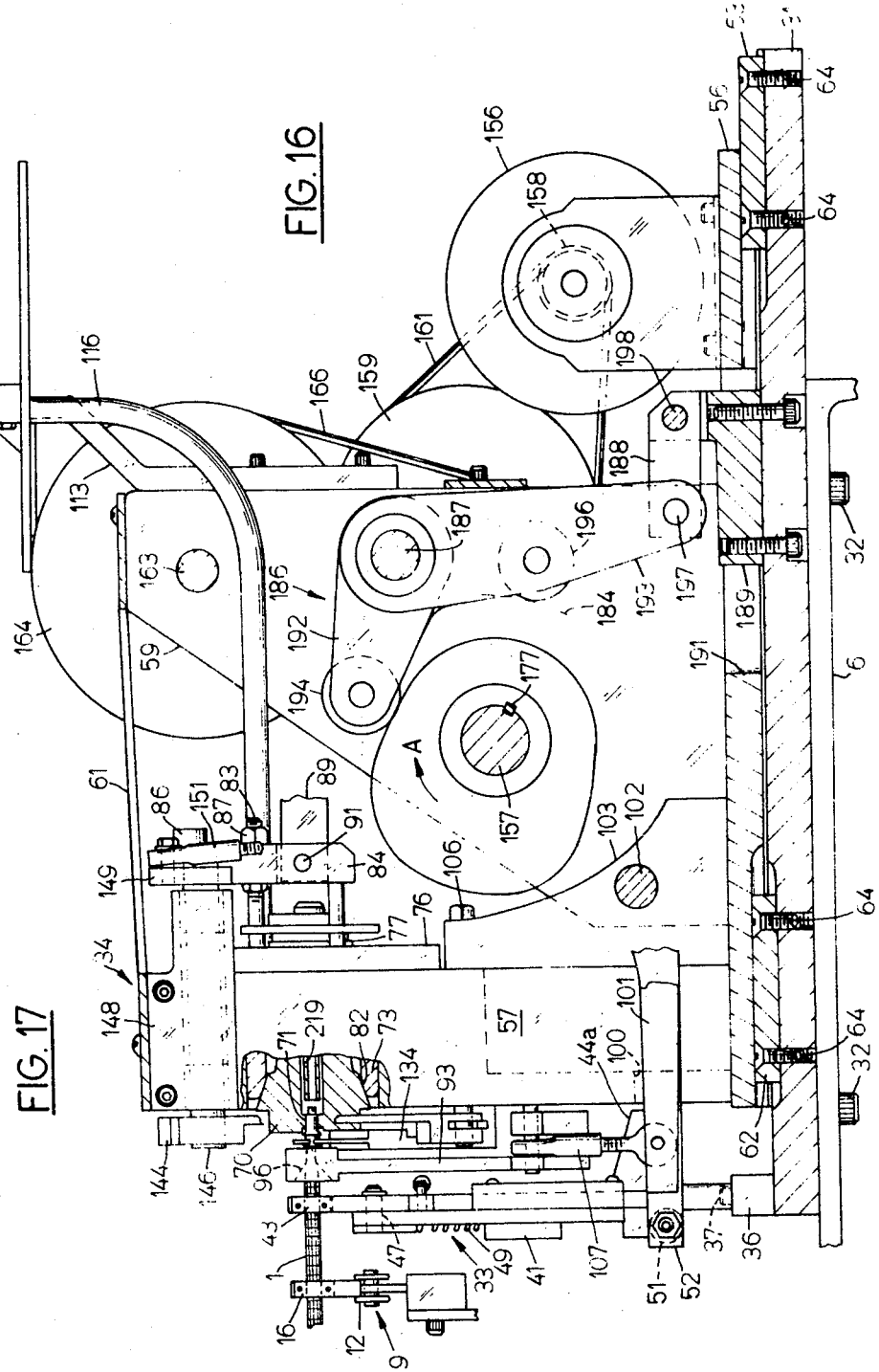
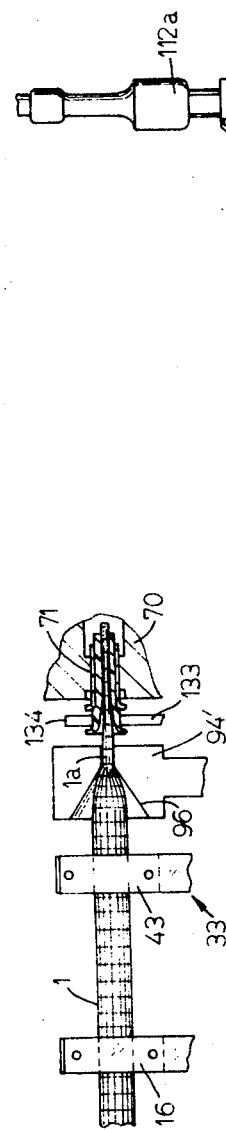

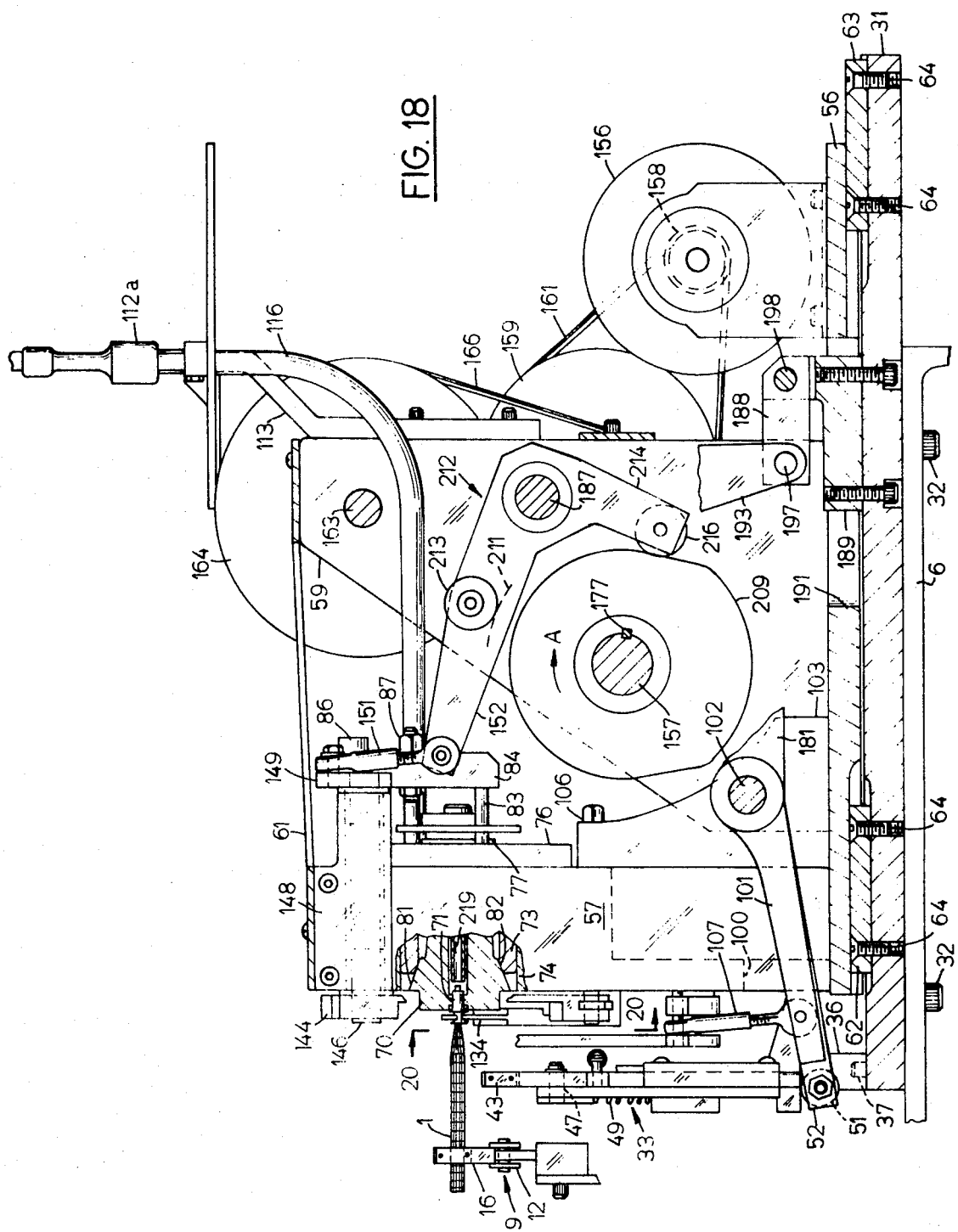

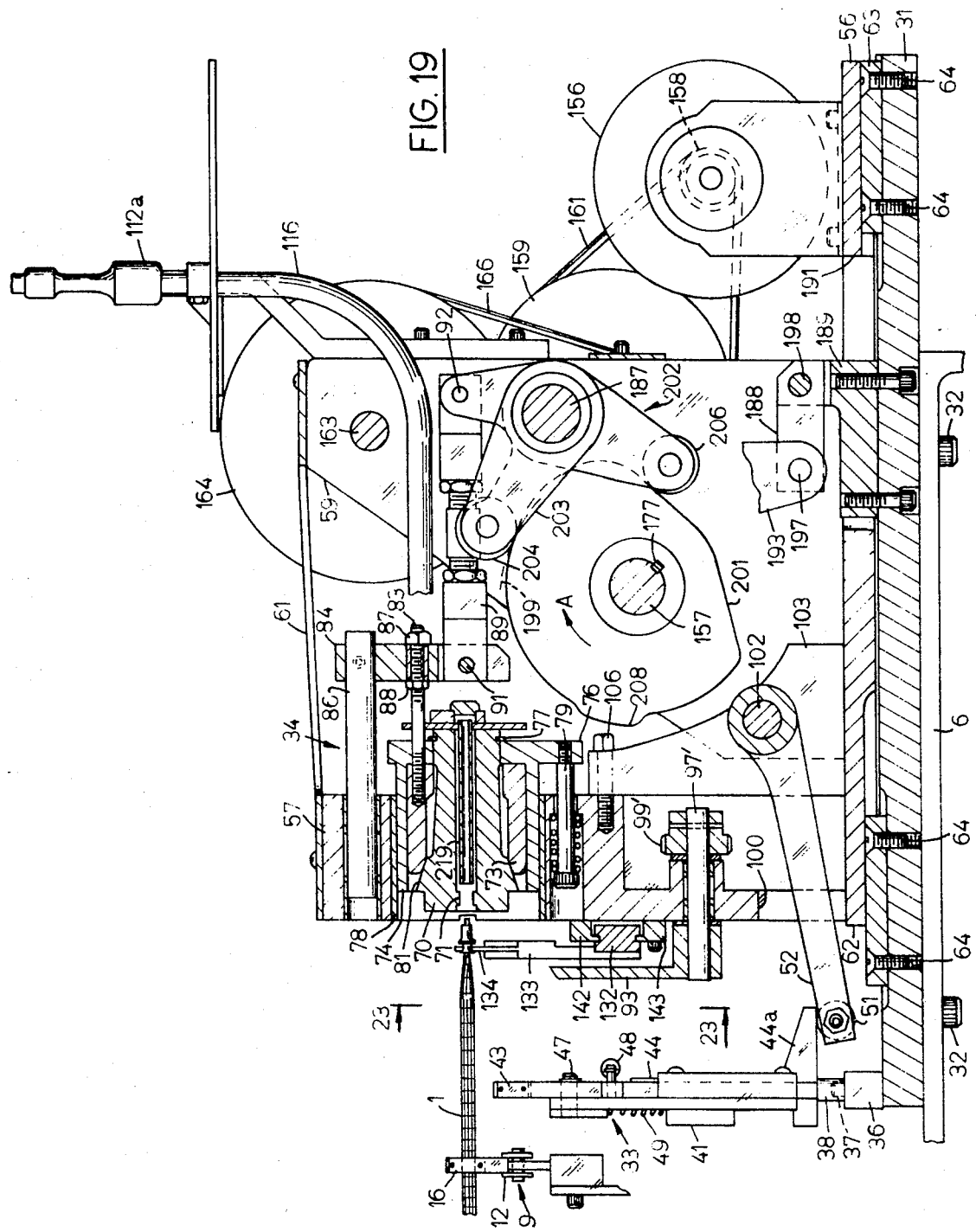

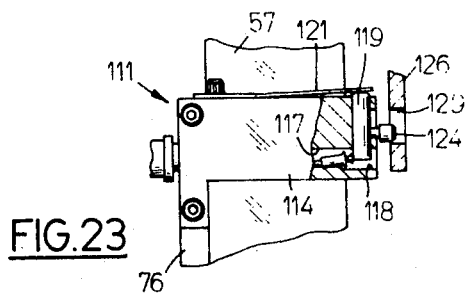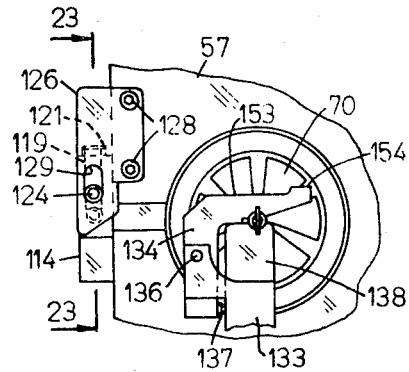

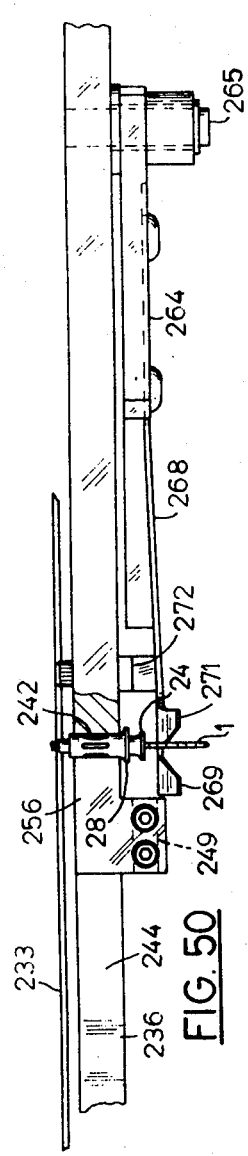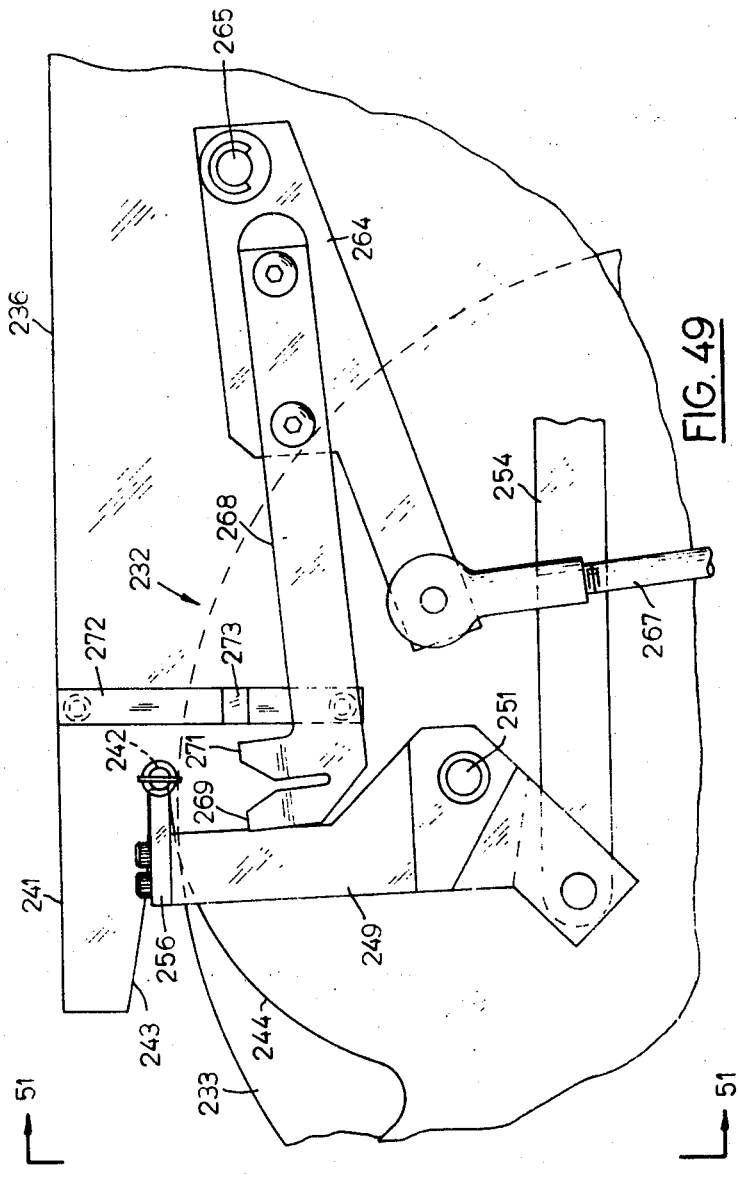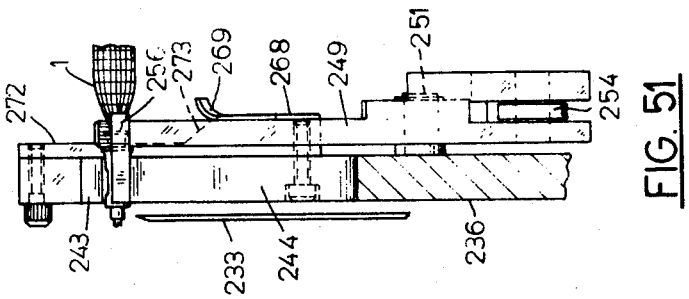

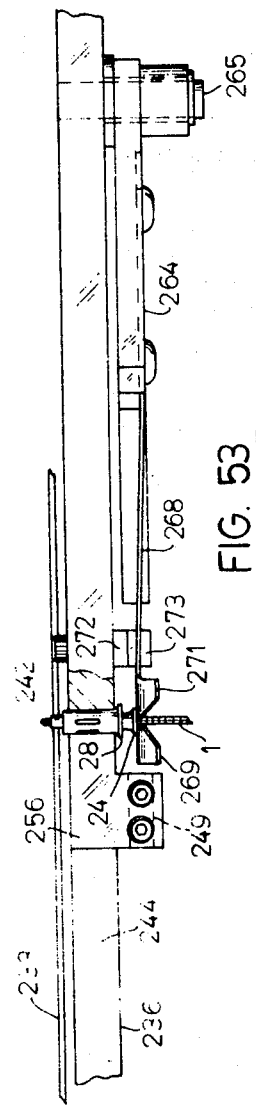
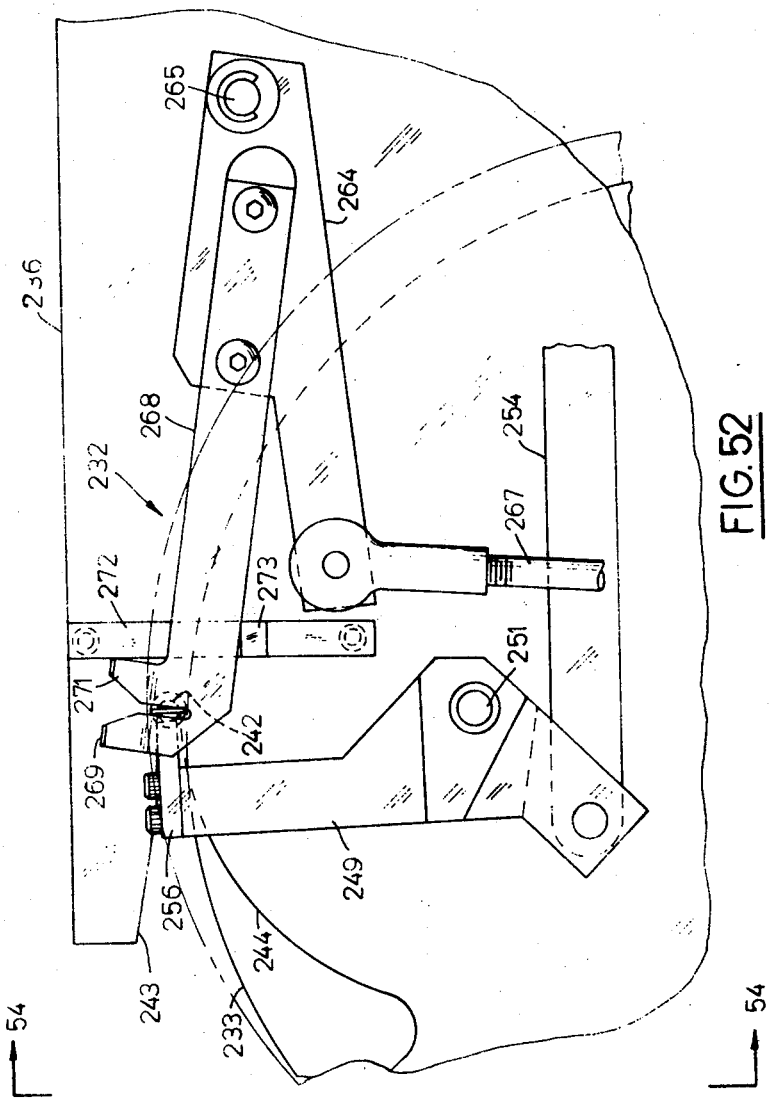
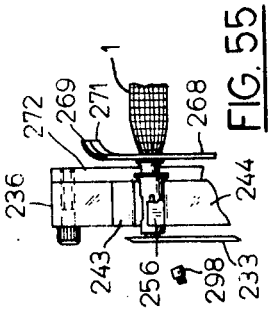
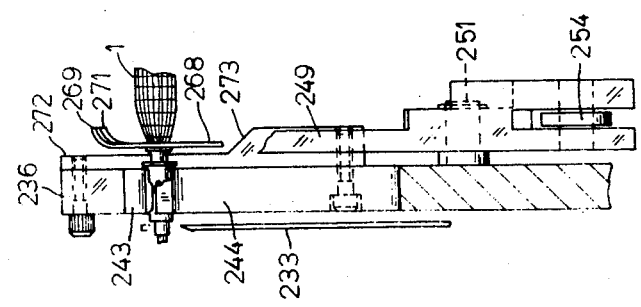

METHOD AND APPARATUS FOR PRODUCING FLEXIBLE FIBER OPTICAL LIGHT CONDUCTORS

The invention relates to fiber optics, and it is concerned more particularly with the production of a flexible fiber optical light conductor which may be used to illuminate a restricted area by endwise light admission to a portion of the conductor remote from the area to be illuminated and by light emission from another portion of the conductor in proximity to that area.

The principal object of the invention is to provide a fiber optical light conductor of the mentioned character which incorporates a length of fiber optical ribbon and a ferrule at least at one end of the ribbon by means of which the fibers of the ribbon are clenched into substantially cylindrical shape and present a plane end face through which light may be admitted to and emitted from the ribbon.

A further object of the invention is to provide a simple and efficient method of producing a flexible fiber optical light conductor of the above mentioned character.

A further object of the invention is to provide power operated equipment for automatically producing fiber optical light conductors of the above mentioned character at high speed and in large quantities.

A still further object of the invention is to provide an apparatus for attaching ferrules to fiber optical ribbons, and more particularly one which is operable to automatically attach a ferrule to each of a series of successive fiber optical ribbons.

A still further object of the invention is to provide a ferrule trimming apparatus for use in connection with a ferrule attaching apparatus, whereby a plane, light admitting and emitting end face may be formed on a fiber optical ribbon having an attached fiber gathering ferrule, by slicing off an end portion of the ferrule and enclosed ribbon fibers.

These and other objects and advantages of the invention will become apparent from the following detailed description.

THE DRAWINGS

FIG. 14 is an elevational view on line 14—14 of FIG. 1 showing the left side of a ferrule attaching apparatus parts being broken away and shown in section;

FIG. 16 is a view similar to FIG. 15 showing parts in a ferrule attaching position;

FIG. 17 is an enlarged view of a portion of FIG. 16, parts being broken away and shown in section;

FIG. 18 is a view similar to FIG. 16 showing parts in a ferrule crimping condition;

FIG. 19 is a view similar to FIG. 18 showing parts in a ferrule releasing condition;

FIG. 22 – 29 are diagrammatic views illustrating various operating phases of the ferrule attaching apparatus shown in FIGS. 14 to 19;

FIG. 49 is an enlarged view of a ferrule positioning mechanism in a condition of adjustment the same as shown in FIG. 47;

FIG. 50 is a top view partly in section of the mechanism shown in FIG. 49;

FIG. 51 is a view on line 51—51 of FIG. 49;

FIG. 52 is a view similar to FIG. 49, but showing parts in a different condition of adjustment;

FIG. 53 is a top view partly in section of the mechanism shown in FIG. 52;

FIG. 54 is a view on line 54—54 of FIG. 52;

FIG. 55 is a detailed view illustrating a ferrule slicing operation;

DETAILED DESCRIPTION

Figure 1:
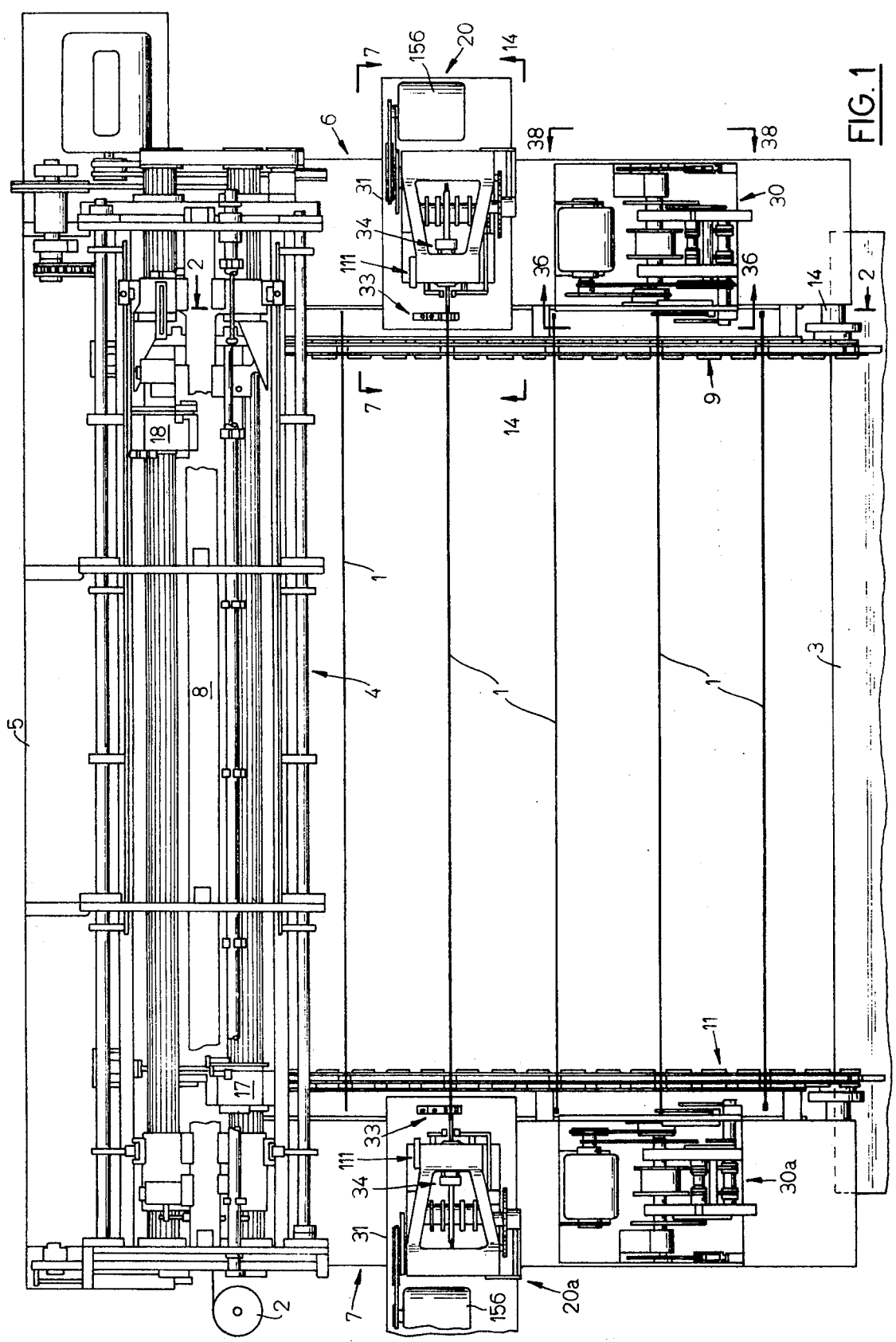
FIG. 1 is an overall plan view of an apparatus for producing fiber optical light conductors in accordance with the invention.

The apparatus shown in FIG. 1 performs generally three principal operations, namely; it pulls lengths of fiber optical ribbon 1 from a supply reel 2 and after cutting, conveys them sidewise step-by-step to a collecting trough 3; it attaches a ferrule (FIG. 5) to at least one end, or if desired to each end, of the ribbons; and slices a short end piece from each ferrule (FIG. 6) so as to provide the ribbon portion therein with a plane, light admitting and emitting end face.

The operation of pulling lengths of ribbon 1 from the supply reel 2 and of conveying them step-by-step to the collecting trough 3 is performed by a portion of the machine which in FIG. 1 is generally designated by the reference character 4. It comprises a transverse frame section 5, side frame sections 6 and 7; a ribbon length measuring and cutting mechanism 8 on the frame section 5 and a pair of parallel ribbon transfer conveyors 9 and 11 between the side frames 6 and 7.

Figure 2:
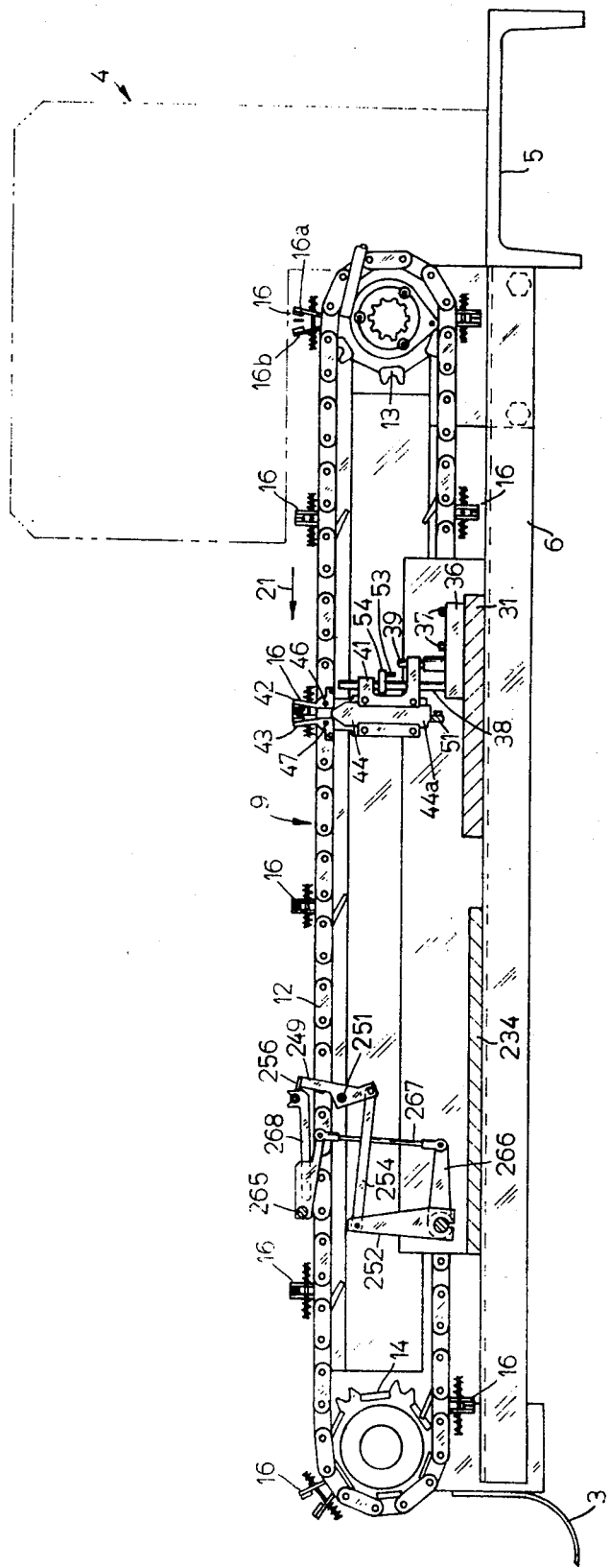
FIG. 2 is a sectional view on line 2—2 of FIG. 1.

As shown in FIG. 2, a ribbon transfer conveyor 9 comprises an endless chain 12 and associated driving and idler sprockets 13 and 14. A series of identical ribbon gripping clamps 16 are mounted on chain 12 at equal spacings from each other. As the chain is moved in the direction of arrows 21 by anti-clockwise rotation of the drive sprocket 13 as viewed in FIG. 2, complementary ribbon gripping jaws 16a and 16b of each clamp are successively actuated so as to move to an open ribbon straddling position at the upper periphery of the drive sprocket 13, then to a closed ribbon gripping position in which the clamp moves toward the idler sprocket 14, then to a ribbon releasing position at the idler sprocket 14, and then to a reclosed position for travel without a ribbon along the lower run of the chain toward the drive sprocket 13. The ribbon transfer conveyor 11 is a duplicate of the ribbon transfer conveyor 9 and the ribbon gripping clamps on the conveyor 11 are transversely aligned with the ribbon gripping clamps on the conveyor 9. The ribbon length measuring and cutting mechanism 8 on the frame section 5 includes a pair of counter reciprocating feeding clamps 17 and 18 which alternately pull a desired length of ribbon from the ribbon supply reel 2 and after cutting, drop the ribbon length 1 into a pair of transversely aligned open ribbon gripping clamps 16. The clamps 16 then close and the conveyors 9 and 11 are advanced in unison from standstill in the direction of arrow 21 in FIG. 2 by a fractional rotation of the drive sprocket 13. This causes the entire series of clamps to advance a distance equal to the spacing at which they are mounted on the conveyor chains. The conveyors then are kept at standstill for a short period of time during which the ribbon length measuring and cutting apparatus 8 pulls a new length of ribbon from the supply reel 2 and deposits it into open ribbon gripping clamps on the conveyor chains.

For a more detailed description of the ribbon measuring, cutting, and transfer apparatus, reference may be had to U.S. Pat. No. 3,701,301, issued on Oct. 31, 1972 to Ragnar Gudmestad for "Wire Length Measuring and Cutting Apparatus."

The ferrule attaching operation of the machine shown in FIG. 1 may be performed at either end of each ribbon 1 or at both ends simultaneously. A ferrule attaching apparatus 20 on the side frame 6 provides for the attachment of a ferrule to the end of a fiber optical ribbon 1 projecting from the conveyor 9 toward the side frame 6, and a ferrule attaching apparatus 20a which is mounted on the side frame 7 and which is an opposite hand duplicate of the apparatus 20 provides for the attachment of a ferrule to the end of a fiber optical ribbon 1 projecting from the conveyor 11 toward the side frame 7.

As illustrated by FIG. 1, five lengths of fiber optical ribbon 1 have been pulled from the supply reel 2 and placed into the space between the side frames 6 and 7 by the conveyors 9 and 11. The ribbons 1 are longer than the spacing between the transfer conveyors 9 and 11, and overhanging end portions of the ribbons extend toward the side frames 4 and 6. While the conveyors are at standstill, one of the ribbons 1 is aligned with the ferrule attaching apparatus 20 and 20a, and another of the ribbons is aligned with ferrule trimming apparatus 30 and 30a. If a ferrule is to be attached to only one end of each ribbon, the ferrule attaching apparatus and ferrule trimming apparatus for the other end will of course be omitted. The fiber optical ribbon 1 to which the ferrule is attached is a commonly known and commercially available product. It comprises a number of lengthwise extending continuous fibers and spaced, parallel cross threads which hold the longitudinal fibers together in a common plane.

Figure 3:
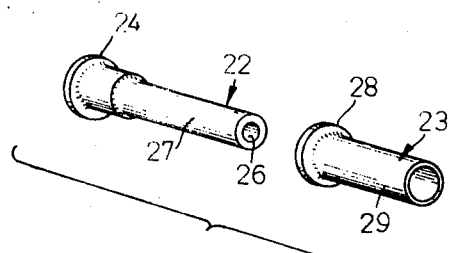
FIG. 3 is an exploded view of a two-part ferrule.
Figure 4:
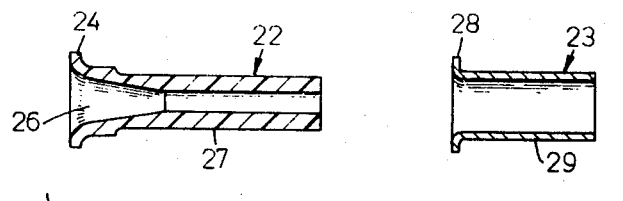
FIG. 4 is a sectional view of the parts shown in FIG. 3.
Figure 5:
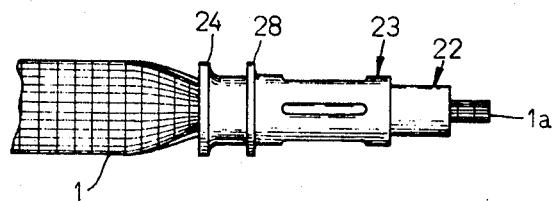
FIG. 5 is an elevational view of an assembled fiber optical ribbon and ferrule.

Referring to FIGS. 3 and 4, the ferrule which is to be attached to the end of fiber optical ribbon 1, comprises a plastic sleeve 22 and a metal sleeve 23 which may be assembled as illustrated by FIG. 5. The plastic sleeve 22 as shown in section in FIG. 4 has an end flange 24, a funnel shaped ribbon admitting passage 26, and a tubular portion 27. The metal sleeve 23 has an end flange 28, and a cylindrical tubular portion 29 which in the assembled condition of the ferrule as shown in FIG. 5 is crimped upon the cylindrical portion 29 of a plastic sleeve 22.

FIG. 5 shows the ribbon and ferrule assembly as it is produced by the ferrule attaching apparatus 20 or 20a, as the case may be. A generally cylindrical portion 1a of gathered ribbon fibers projects beyond the free end of the plastic ferrule sleeve 22.

Figure 6:
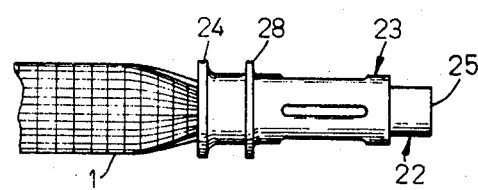
FIG. 6 is a view similar to FIG. 5, but showing the ferrule in trimmed condition.
Figure 6A:
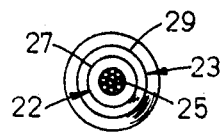
FIG. 6a is an end view of FIG. 6.

In order to provide the ribbon with a plane light admitting and emitting end face the ribbon and ferrule assembly shown in FIG. 5 is trimmed by slicing a short end portion from it, thereby producing the final assembly shown in FIGS. 6 and 6a, with a plane light admitting and emitting end face 25.

THE FERRULE ATTACHING APPARATUS

The principal components of the ferrule attaching apparatus 20 are a base plate 31 (FIG. 7) which is fixedly secured to the side frame 6 by bolts 32; a ribbon holding unit 33 which is mounted on the end of the base plate 31 next to the conveyor 9; and a tool slide 34 which is reciprocably mounted on the base plate 31 for forward movement from a retracted position (FIGS.

7, 14, 15 and 19) into a projected position (FIGS. 16 and 18) and for backward movement from the projected position (FIGS. 16 and 18) into the retracted position (FIGS. 7, 14, 15 and 19).

Figure 15:
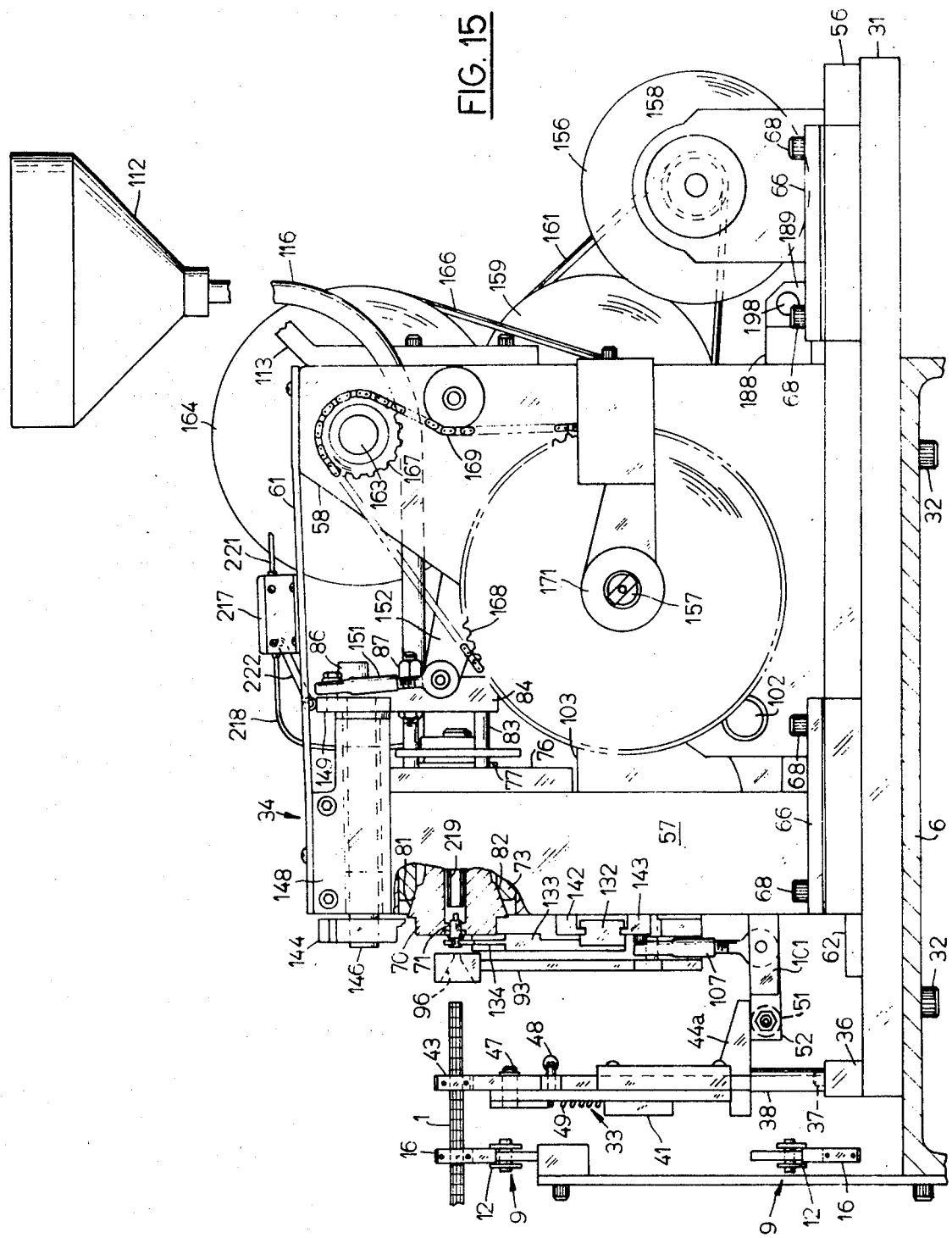
FIG. 15 is a view similar to FIG. 14 showing parts in a different condition of adjustment.

The ribbon unit 33 serves to steady the overhanging end portion of the ribbon 1 during the ferrule attaching operation. It comprises a pedestal 36 (FIG. 10) which is fixedly secured to the base plate 31 by cap screws 37 and has a fixed main post 38 and a fixed auxiliary post 39. Slideably mounted on the posts 38, 39 for up and down movement is a bracket 41 which carries a pair of ribbon gripping jaws 42, 43, and an up and down movable cam slide 44. The jaws 42, 43 are supported on the bracket 41 by pivot pins 46, 47 and are urged into a clamp opening position by a tension spring 48. The cam slide 44 has a tapered head portion which upon upward movement of the slide 44 enters between the jaws 42, 43 and forces them into clamp closing position in opposition to the tension of the spring 48. A vertical compression spring 49 reacts between the bracket 41 and the cam slide 44 so as to urge a rearwardly projecting finger portion 44a thereof (FIG. 14) downwardly upon a roller 51 on the forward end of an actuating arm 52 on the tool slide 34. The arm 52 is connected with an operating mechanism on the tool slide, to be described later, for upward swinging movement from the downwardly adjusted position in which it is shown in FIG. 14 to the upwardly adjusted position in which it is shown in FIG. 15, and vice versa.

Figure 7:
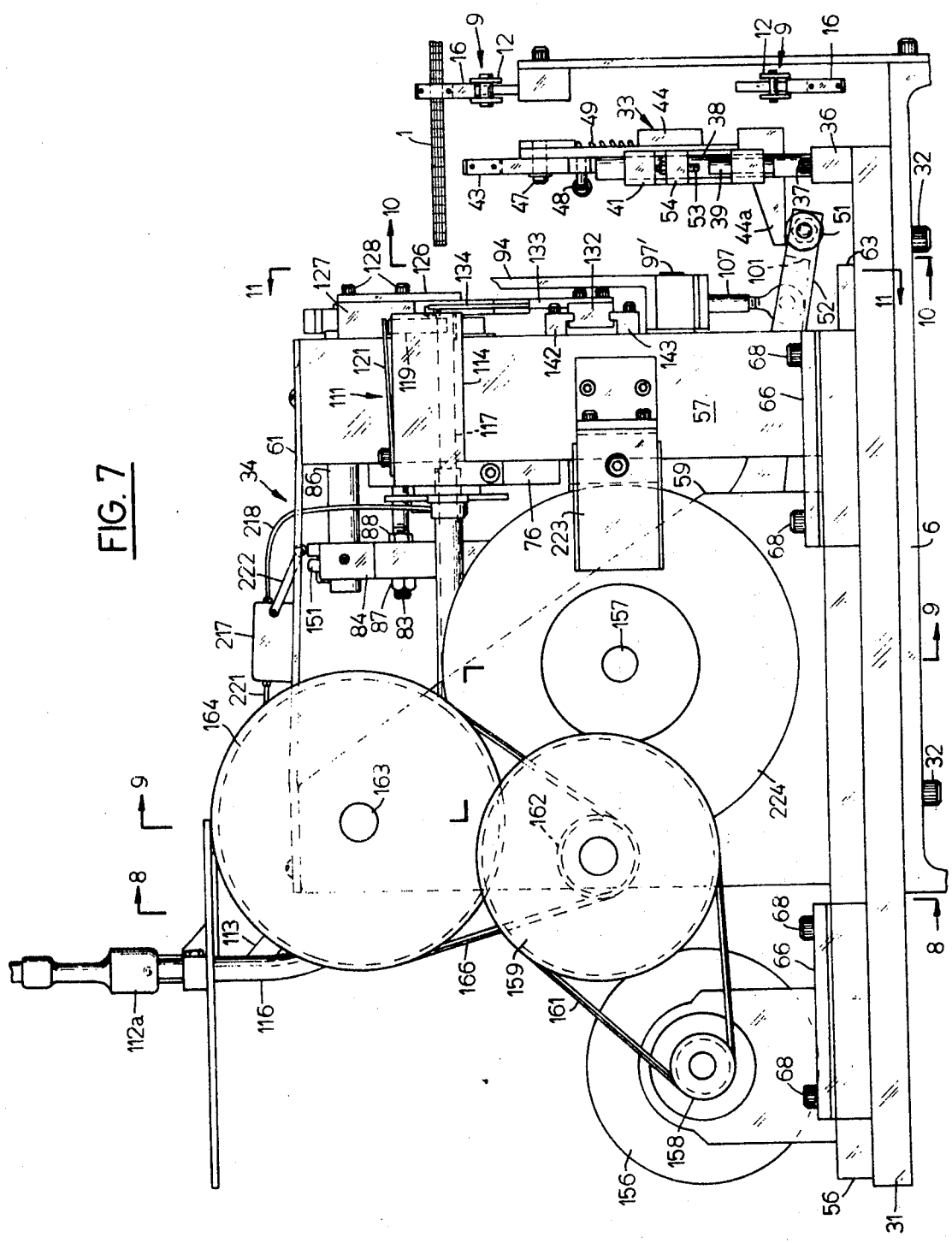
FIG. 7 is an elevational view on line 7—7 of FIG. 1, showing the right side of a ferrule attaching apparatus.
Figure 10:
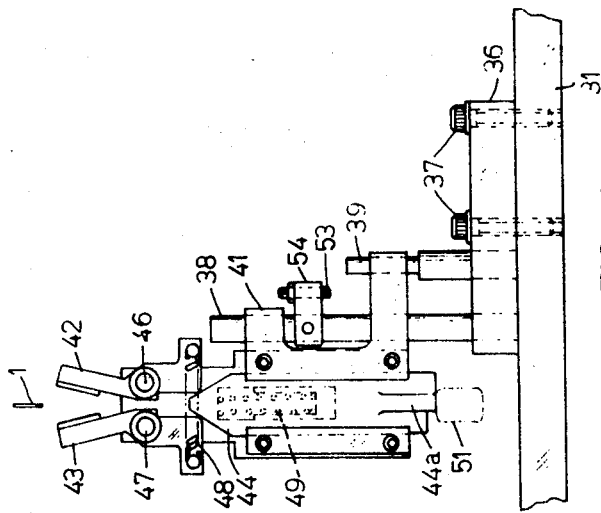
FIG. 10 is an elevational view on line 10—10 of FIG. 7 showing a ribbon holding unit in a lowered position.

When the ribbon transfer conveyors 9 and 11 (FIG. 1) have come to a temporary standstill, an overhanging end portion of a ribbon 1 extends horizontally toward the retracted tool slide 34 while the ribbon holding unit 33 is in the lowered clamp opening position in which it is shown in FIGS. 7, 10 and 14. The actuating arm 52 is then swung upward from the lowered position in which it is shown in FIGS. 7, 14 and 19 to the raised position in which it is shown in FIG. 15. Upward thrust of the roller 51 against the finger 44a first raises the bracket 41 until it contacts a set screw 53 on an arm 54 secured to the pedestal post 38. Such upward movement of the bracket 41 brings the open gripping jaws 42, 43 to the level of the ribbon 1, and continued upward movement of the actuating arm 52 then forces the tapered head of the cam slide 44 between the jaws 42, 43 and causes them to close upon the ribbon 1 and clamp it flatwise at a predetermined distance from its free end in an endwise and laterally fixed position. Subsequently, the tool slide 34 is advanced from the retracted position in which it is shown in FIG. 15 to the projected position in which it is shown in FIG. 16, and a ferrule will be attached to the ribbon while it is held by the raised and closed clamping jaws 42, 43, as will be explained more fully hereinbelow.

Before the transfer conveyors 9 and 11 start moving again after completion of the ferrule attaching operation, the ribbon holding unit 33 is adjusted from its raised clamp closing position (FIGS. 15 and 16) to its lowered clamp opening position (FIGS. 10 and 18) by downward swinging movement of the actuating arm 52 from the position in which it is shown in FIG. 16 to the lowered position in which it is shown in FIG. 18.

The tool slide 34 is a back and forth movable unitary structure which comprises a frame assembly and various mechanisms thereon for performing the ferrule attaching operation.

The frame assembly of the tool slide 34 comprises a bottom plate 56 (FIG. 15), a front block 57, a left side wall 58 (FIGS. 8 and 15), a right side wall 59 (FIGS. 8 and 17) and a top plate 61. The bottom plate 56 is slideably supported on bearing plates 62, 63 (FIG. 14) secured to the base plate 31 by screws 64; and retainer straps 66, 67 (FIGS. 7 and 9) for the bottom plate 56 are secured to the base plate 31 at the left and right sides, respectively, of the tool slide by cap screws 68.

Figure 13:
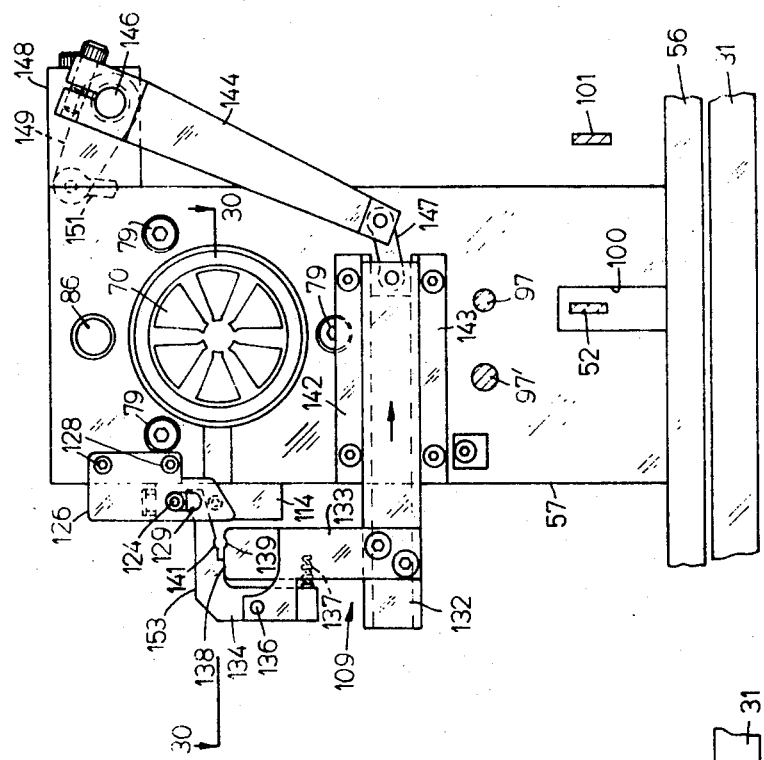
FIG. 13 is a view similar to FIG. 11 with parts omitted for purposes of exposure.

The front block 57, as shown in FIGS. 13 and 14 mounts an axially slotted, radially contractable and expandible collet 70 which has a central, axially extending ferrule seating passage 71 at its forward end facing the conveyor 9. The ferrule seating passage 71 has internal teeth 72 (FIG. 35) by means of which the metal sleeve 23 (FIG. 3) of a ferrule may be crimped upon the plastic ferrule sleeve 22 as illustrated by FIG. 5, and as will be more fully discussed hereinbelow.

Figure 30:
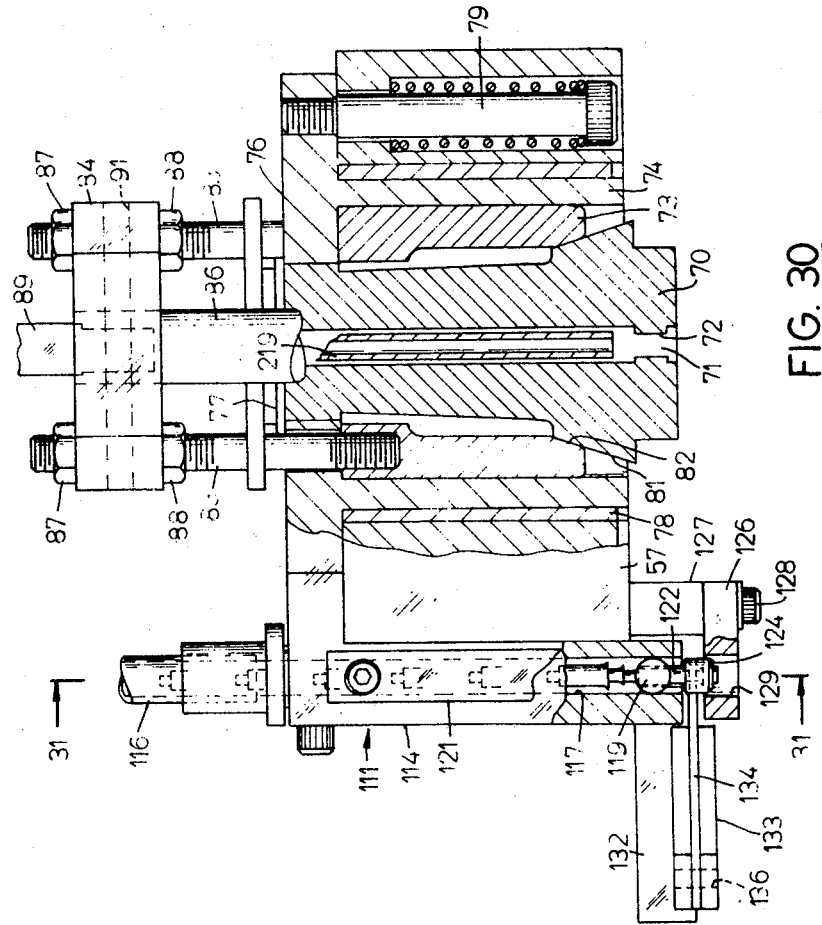
FIG. 30 is a sectional view on line 30—30 of FIG. 13.

As shown in FIG. 14, and on an enlarged scale in FIG. 30, the collet 70 is surrounded by an axially shiftable wedge collar 73 which in turn is surrounded by s supporting sleeve 74. At its rear end the sleeve 74 has a radial flange 76 which extends inward behind the wedge collar 73, and outward at the rear side of the front block 57. The rear end of the collet 70 extends axially through and is radially supported in the inwardly extending portion of the flange 76, and a snap ring 77 on the collet secures it against axial forward movement within the sleeve 74.

Figures 8, 9:
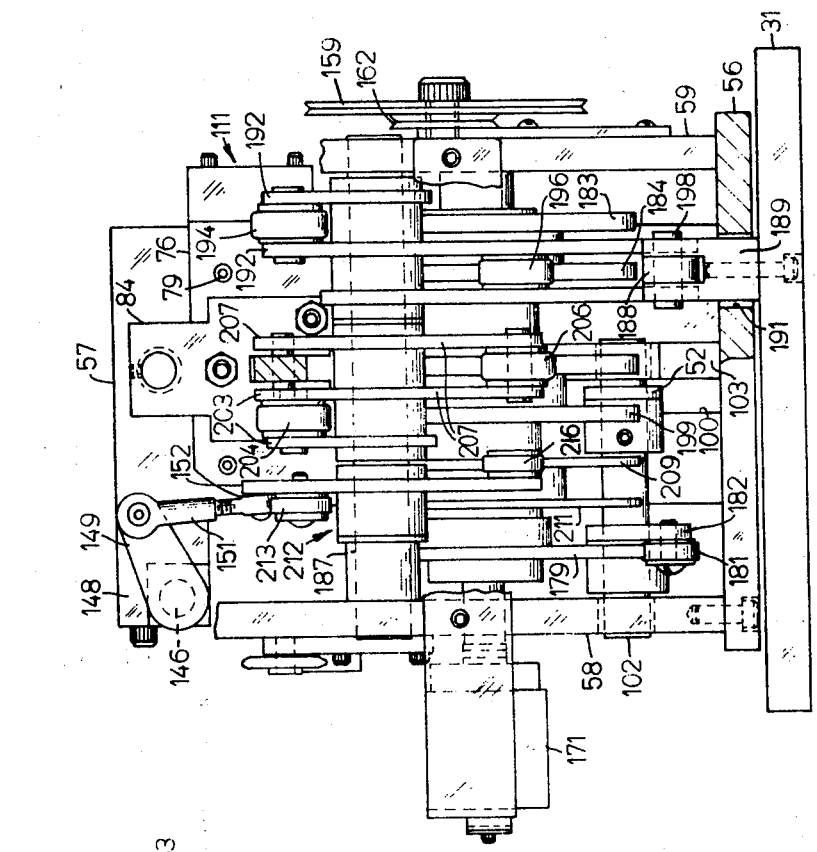
FIG. 8 is an elevational view on line 8—8 of FIG. 7, showing a rear side of the apparatus shown in FIG. 7.
FIG. 9 is a sectional view on line 9—9 of FIG. 7.

The assembled collet 70, wedge collar 73 and sleeve 74 form a collet head which is shiftable axially back and forth in a bearing bushing 78 of the front block 57 of the tool slide 34. The collet head 70, 73, 74 is urged into a forwardly projected position on the block 57 by three spring loaded studs 79, one of which is shown in FIG. 30, and which are circumferentially spaced 120 degrees apart as shown in FIG. 9.

The collet 70 (FIG. 30) has a rearwardly tapering outer cone face 81, and the wedge collar 73 has a complementary inner cone face 82 which overlaps the cone face 81 of the collet and provides for radial expansion and contraction of the collet by axial back and forth movement of the collar 73 within the sleeve 74. Rearward adjustment of the collar 73 to the position in which its rear face abuts the flange 76 causes the collet to expand, and a short forward movement of the collar from its rearward limit position causes the collet to contract and crimp the metal sleeve of a ferrule located in the passage 71 of the collet.

In order to provide for axial back and forth shifting of the collar 73 within the sleeve 78 and also for axial back and forth shifting of the entire collet head 70, 73, 74 within the front block 57 of the tool slide, three threaded studs 83 (FIGS. 9 and 14) are connected to the rear end of the collar 73. The studs extend rearwardly through the flange 76 and through a yoke 84 (FIG. 9 and 14) which is secured to the rear end of a shaft 86 supported for horizontal back and forth shifting movement on the front block 57. The threaded ends of the studs 83 which extend through the yoke 84 carry nuts 87 and 88 which hold the studs and yoke 84 together. Horizontal back and forth movement is transmitted to the yoke 84 by a link 89 (FIG. 19) which has a forward pivot connection 92 (FIG. 19) with an actuating mechanism to be described later.

In addition to the collet head 70, 73, 74 the front block 57 of the tool slide mounts a pair of ribbon clenching arms 93 and 94 (FIGS. 11 and 15) in the space between the ribbon holding unit 33 and the tool slide 34. The purpose of the clenching arms is to provide a funnel 96 (FIG. 15) for gathering the fibers of the ribbon 1 into a substantially cylindrical body 1a (FIG. 17) as the tool slide 34 is moved from the retracted FIG. 15 position to the projected FIG. 16 position. Such gathering of the ribbon fibers enables the free end of the ribbon to slide into a ferrule on the collet 70 while the tool slide moves forward from its retracted position as illustrated by FIGS. 16 and 17.

In detail, a supporting shaft 97 (FIG. 14) for the clenching arms 93 is mounted on the front block 57 for rotation on a horizontal axis, and extends forwardly through a hub portion of the arm 93 which is provided with a set screw 98 (FIG. 11) for securing the arm 93 to the shaft 97. At the rear side of the block 57 a gear wheel 99 is pinned to the rear end of the shaft 97. The clenching arm 94 is similarly mounted on a shaft 97' (FIG. 11) to the forward end of which the arm 94 is secured by a set screw 98', and to the rear end which a gear wheel 99' is pinned which meshes with the gear wheel 99. Back and forth swinging of the arms 93, 94 on the axes of the shafts 97, 97' is obtained by means of an up and down swingable arm 101 (FIGS. 11 and 14) on the tool slide 34. The arm 101 is transversely aligned with the actuating arm 52 (FIG. 11) for the ribbon holding unit 33 on a rock shaft 102 which as shown in FIG. 9, is journalled at one end in the side wall 58 of the tool slide, and at its other end in a bracket 103 which is secured to the bottom plate 56 of the tool slide by a cap screw 104 (FIG. 9) and to the rear of the front block 57 by a cap screw 106 (FIG. 14).

Figure 11:
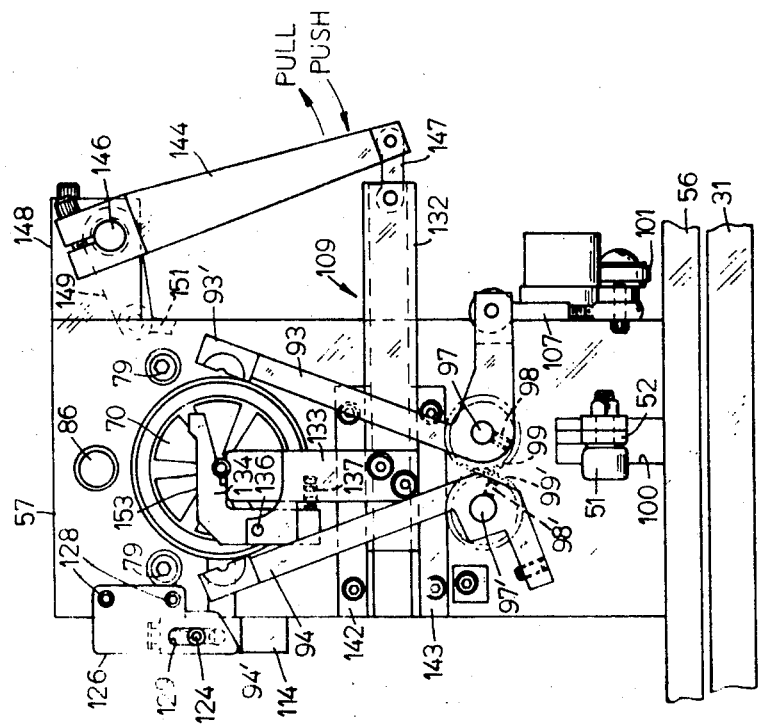
FIG. 11 is an elevational view on line 11—11 of FIG. 7 showing the forward side of the apparatus shown in FIG. 7.

The actuating arm 52 for the ribbon holding unit 33 extends forwardly through a cut-out 100 (FIGS. 11 and 13) of the front block 57, and the actuating arm 101 for the clenching arms 93, 94 extends fowardly past the left side of the front block. A turnbuckle link 107 (FIGS. 11 and 15) connects the forward end of the arm 101 with a side arm 108 of the clenching arm 93. At their free ends the arms 93 and 94 are provided semiconically recessed jaws 93', 94' which form the fiber gathering funnel 96 (FIGS. 15 and 16) when the arms 93, 94 are swung toward each other from the position in which this is shown in FIG. 11 by upward movement of the arm 101 from its FIG. 14 position to its FIG. 15 position.

From the foregoing, it will be noted that the actuating means for the ribbon holding unit 33 including the arm 52, and the actuating means for the ribbon clenching arms 93, 94 including the arm 101 are operatively interrelated so that the ribbon clenching arms will be moved toward each other into a fiber gathering position while the ribbon holding unit is moved into its raised ribbon engaging position, and so that the ribbon clenching arms will be moved out of said fiber gathering position while said ribbon holding unit is moved into its lowered ribbon releasing position.

The tool slide 34 is further provided with a ferrule feeding system which supplies the collet 70 with a new ferrule when a ferrule attaching operation has been completed during a temporary standstill of the ribbon conveyors 9 and 11 (FIG. 1), and before the conveyors are restarted for the next ribbon conveying step. The principal components of the ferrule feeding system are a ferrule transfer slide 109 (FIG. 11), a ferrule dispenser 111 (FIGS. 7 and 8), and a ferrule hopper 112 (FIG. 15).

The hopper 112 is mounted on a bracket 113 (FIG. 14) which is bolted to the tool slide at the rear face of the side plate 59 (FIG. 8), and the dispenser 111 (FIG. 7) comprises a housing block 114 which extends horizontally along the right side of the front block 57 and is bolted at its rear end to the flange 76 (FIGS. 9 and 30) of the collet head 70, 73, 74 (FIG. 30). Accordingly, the dispenser housing 114 will move back and forth in unison with the collet head relative to the front block 57 of the tool slide.

An elbow 116 (FIG. 7) of flexible tubing connects the outlet 112a of the hopper 112 with a ferrule guide passage 117 (FIG. 7), of the dispenser housing 114. Ferrules dropped from the hopper outlet 112a into the elbow 116 align themselves end to end not only within the elbow but also in the horizontal guide passage 117 of the dispenser housing 114 as illustrated by FIGS. 30 to 35. The weight of the ferrules stacked in the vertical portion of the elbow 116 causes a forward feeding thrust upon the endwise aligned ferrules in the horizontal guide passage 117 of the dispener housing 114.

The guide passage 117 (FIG. 31) is cylindrical throughout its length, except for a short axial portion at the ferrule outlet end of the housing 114 where the lower part of the passage is arcuately enlarged to provide a ferrule cradling seat 118. Above the cradling seat 118 a gate pin 119 is reciprocally mounted in a vertical bore of the dispenser housing 114. A leaf spring 121 biases the gate pin 119 toward the cradling seat 118. The gate pin 119 is provided with an actuating stud 122 which extends forwardly through an oblong front opening 123 above the ferrule outlet opening of the dispenser housing 114. The stud 122 carries a roller 124 outside the housing 114 where lifting force for the gate pin 119 is applied to it by the ferrule transfer slide 119 as will be explained later.

Figure 31:
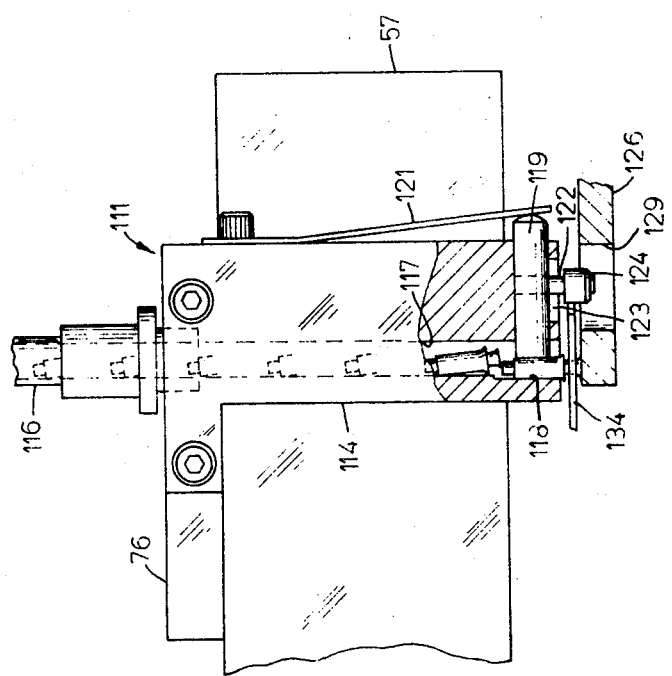
FIG. 31 is a section on line 31—31 of FIG. 30.
Figure 32:
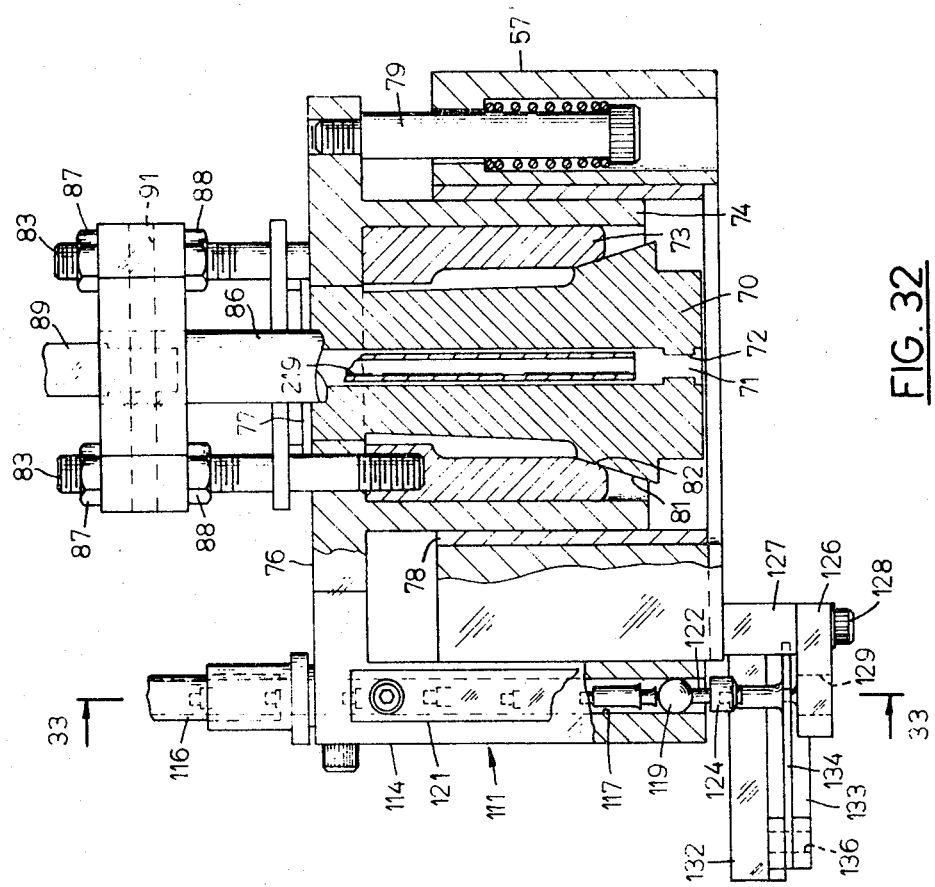
FIG. 32 is a sectional view on line 32—32 of FIG. 20.
Figure 33:
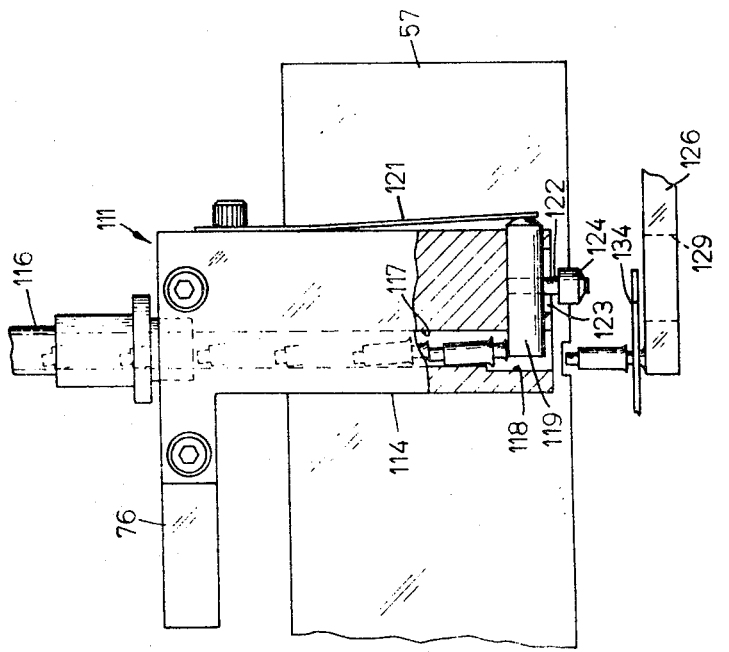
FIG. 33 is a section on line 33—33 of FIG. 32.
Figure 35:
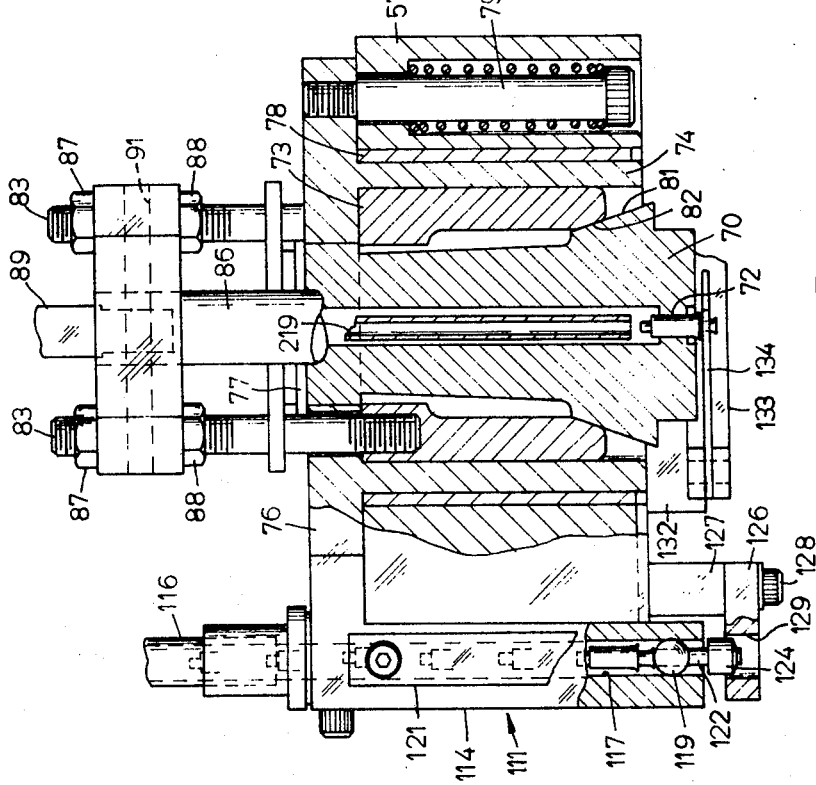
FIG. 35 is a view similar to FIG. 34 but showing parts in a different condition of adjustment.

Referring to FIGS. 7 and 11, the ferrule discharge end of the horizontally reciprocable dispenser housing 114 faces a guard plate 126 which is spaced from the forward side of the tool slide block 57 by a spacer 127. A pair of fastening bolts 128 extend through the plate 126 and spacer 127 and are screw threaded into the block 57 to hold the guard plate 126 fixedly secured to the block at a predetermined distance from the vertical front face of the latter. The guard plate 126 is preferably made of transparent material and provided with a vertically elongated opening 129 in which the roller 124 is movable up and down while the dispenser housing is in its forwardly projected position relation to the block 57 as illustrated by FIGS. 31 and 35. The portion of the guard plate 126 below the oblong opening 129 and its oblique bottom edge 131 provides an abutment in front of the outlet and the ferrule guide passage 117. Horizontal back and forth movement of the dispenser housing 114 relative to the tool slide block 57 varies the gap between guard plate 126 and the front end of the dispenser block; the gap being just wide enough to be bridged by the flanged forward end of a ferrule as shown in FIG. 31, when the dispenser housing 114 is in its projected position, and the gap being wide enough to accommodate the full length of a ferrule, as shown in FIG. 33, when the dispenser housing is in its retracted position.

The transfer slide 109 (FIG. 13) comprises a horizontal bottom bar 132, a bracket 133 secured in an upstanding position to the bottom bar 132 near one end of the latter, and an angular latch 134 connected by a horizontal pivot pin 136 with the bracket 133 for limited rocking movement relative thereto. A coil spring 137 urges the latch 134 into the position in which it is shown in FIG. 13 and in which a shoulder 138 thereof bears upon the top of the bracket 133. Complementary arcuate notches 139 and 141 in the bracket 133 and the latch 134, respectively, provide for the clamping of a ferrule to the transfer slide 109 as illustrated by FIGS. 11 and 14.

As shown in FIGS. 13 and 14, the bottom bar 132 of the transfer slide 109 is mounted on the front block 57 of the tool slide 34 for horizontal back and forth movement between guide rails 142 and 143. A mechanism for transmitting outward push and inward pull to the transfer slide, as indicated by the arrows in FIGS. 20 and 21, comprises a lever 144 (FIG. 11) which is secured to the forward end of a rock shaft 146 (FIGS. 11 and 15). At its free end, the lever 144 (FIG. 11) is connected to the bar 132 by a link 147. As shown in FIGS. 11 and 15, a mounting bracket 148 for the shaft 146, is secured laterally to the upper part of the tool slide front block 57, and the shaft 146 is rotatable in the bracket 148 on a horizontal fore and aft extending axis. Secured to the rear end of the shaft 146 (FIG. 15) behind the bracket 148 is a rocker arm 149 (FIG. 8), and a link 151 connects the rocker arm 149 with an up and down swingable arm 152 (FIG. 15) of an actuating mechanism to be described later.

Horizontal back and forth shifting of the transfer slide 109 by swinging of the arm 144 in opposite direction on the axis of shaft 146 moves the angular latch 134 of the transfer slide into and out of cooperative engagement with the roller 124 of the gate pin 119 (FIG. 31), provided that the dispenser housing 114 is in its forwardly projected position on the tool slide front block 57 as shown in FIG. 30. The top edge of the latch 134 (FIG. 21) provides a cam track including an elongated straight horizontal cam face 153 and a shorter straight horizontal cam face 154 on a somewhat higher level than the cam face 153.

Figure 21:
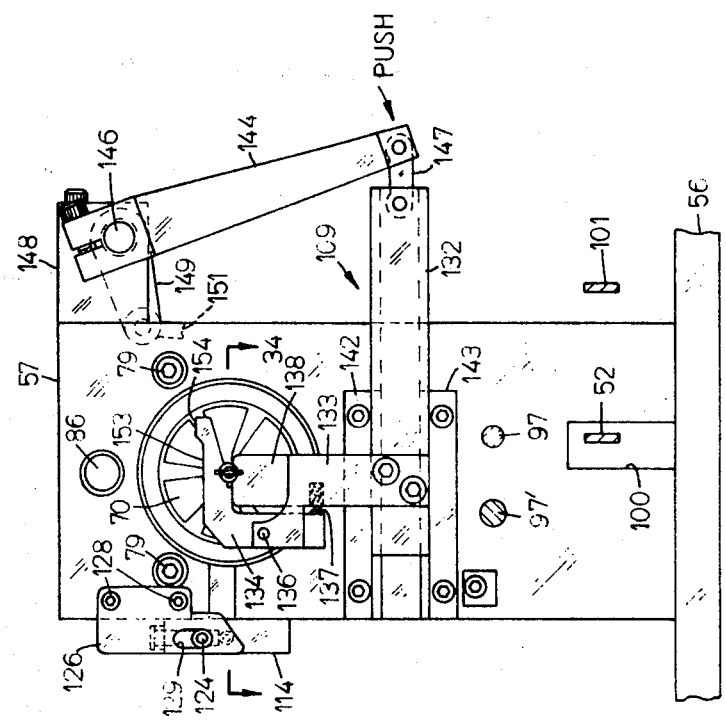
FIG. 21 is a view similar to FIG. 20, but showing parts in a ferrule delivering position.

FIGS. 22 and 23 illustrate the condition of the ferrule dispenser 111 while the transfer slide 109 is in the inner position as shown in FIGS. 11 and 21. Under these circumstances the ferrule guide passage 117 is blocked by the gate pin 119 which is held down by the leaf spring 121.

FIGS. 24 and 25 illustrate the condition of the ferrule dispenser 111 while the transfer slide is in the pushed out position shown in FIG. 13 and while the dispenser housing 114 is in its forwardly projected position on the tool slide front block 57. Under these circumstances, the ferrule guide passage 117 is unblocked, the gate pin 119 being held in a fully raised position by the roller 124 resting on the elevated cam face 154 of the latch 134. The weight of the ferrules stacked in the vertical leg of the elbow 116 (FIG. 7) will cause a ferrule to slip upon the cradling seat 118 (FIG. 31) of the dispenser housing 114 and slide axially forward against the guard plate 126.

Figure 20:
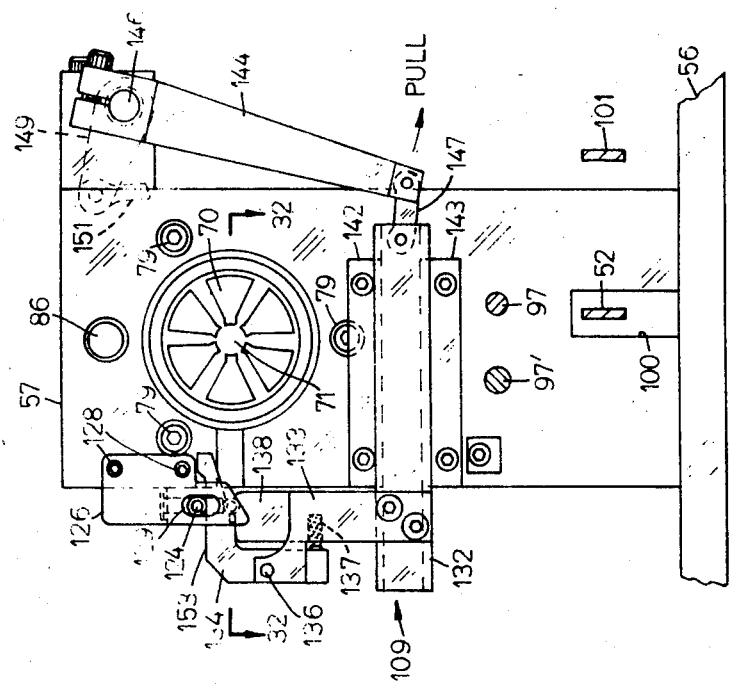
FIG. 20 is a view similar to FIG. 13 but showing parts in a ferrule pick-up position.

FIGS. 26 and 27 illustrate the condition of the dispenser 111 while the transfer slide is in the partly pulled in position shown in FIG. 20 and while the dispenser housing is in its projected position relative to the tool slide front block 57. Movement of the transfer slide from the FIG. 13 position to the FIG. 20 position brings the recesses 139 and 141 of the bracket 133 and latch 134 into gripping engagement with the ferrule portion which, as shown in FIG. 25 bridges the gap between the dispenser housing 114 and the guard plate 126. The gate pin 119 is pressed upon the underlying ferrule by the spring 121.

FIGS. 28 and 29 illustrate the condition of the dispenser 111 while the transfer slide is in the FIG. 20 position and while the dispenser housing is in its retracted position relative to the tool slide front block 57. Retraction of the dispenser housing widens the gap between its front face and the guard plate 126, and in the fully retracted position of the dispenser housing as shown in FIG. 29, its front face is spaced from the rear end of the ferrule which has been clasped between the notches 139 and 141 of the bracket 133 and latch 134 and which is retained therebetween by the pressure of the coil spring 137. The transfer slide with the ferrule thereon may then be moved from the FIG. 28 position to the FIG. 22 position which is illustrated on an enlarged scale by FIG. 34. While the transfer slide and ferrule thereon move from the FIG. 28 position to the FIG. 22 position the rear end of the ferrule clears the front block 57 of the tool slide and it also clears the collet 70 (FIG. 32) which has moved to its retracted position on the front block 57 in unison with dispenser housing 114.

Figure 34:
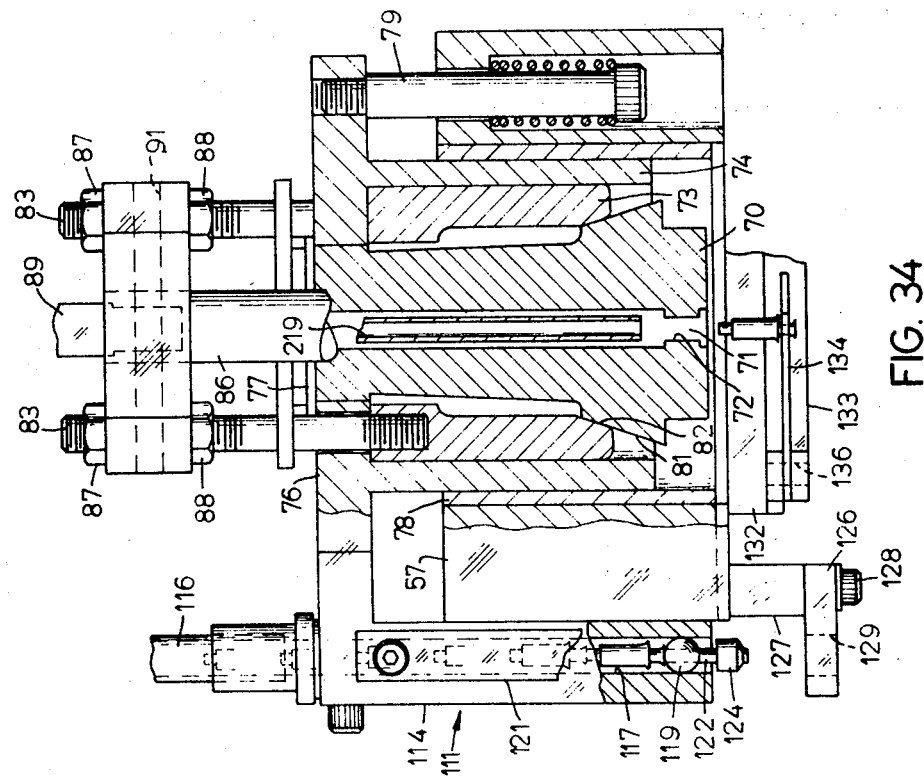
FIG. 34 is a sectional view on line 34—34 of FIG. 21.

Arrival of the transfer slide in the FIG. 34 position aligns the ferrule on the transfer slide with the ferrule seating passage 71 of the retracted collet 70. Subsequent forward movement of the collet head 70, 73, 74 as illustrated by FIG. 35, brings the expanded collet over the ferrule and the wedge collar 73 will be advanced just enough so that the collet will grip the ferrule very lightly and the metal sleeve 23 of the ferrule will not be crimped while the tool slide 34 is in the retracted position in which it is shown in FIGS. 14 and 15.

The ferrule attaching apparatus 20 (FIG. 1) is powered by an electric motor 156 which is mounted on the base plate 56 (FIG. 7) of the tool slide 34 for back and forth movement therewith relative to the stationary side frame 6 (FIG. 1) of the machine. A speed reducing power transmitting mechanism between the motor 156 and a cam supporting shaft 157 (FIGS. 7 and 9) comprises a small diameter driving pulley 158 on the motor shaft; a large diameter driven pulley 159 rotatably mounted on the side wall 59 of the tool slide and connected to the motor pulley 158 by a belt 161, a small diameter pulley 162 coaxially connected with the pulley 159 for rotation therewith; a counter-shaft 163 (FIG. 9) rotatably supported on the side walls 58 and 59 of the tool slide 34; a large diameter pulley 164 secured to the shaft 163 and connected to the pulley 162 (FIG. 7) by a belt 166; a small diameter sprocket wheel 167 (FIG. 9) secured to the counter shaft 163 at the outer side of the side wall 58 of the tool slide; a large diameter sprocket wheel 168 (FIG. 14) rotatably mounted on the cam supporting shaft 157 and connected to the sprocket 167 by a drive chain 169; and a one-revolution clutch 171 (FIG. 9) operatively interposed between the sprocket wheel 168 and the cam supporting shaft 157.

The shaft 157 mounts four axially aligned hubs 172, 173, 174 and 176 between the side walls 58 and 59 of the tool slide, all the hubs being secured for rotation in unison with the shaft 157 by a key 177. Set screws 178 in the hubs 172, 174 and 176 are drawn up against the shaft 157 to secure the hubs against axial shifting along the shaft 157.

Figure 12:
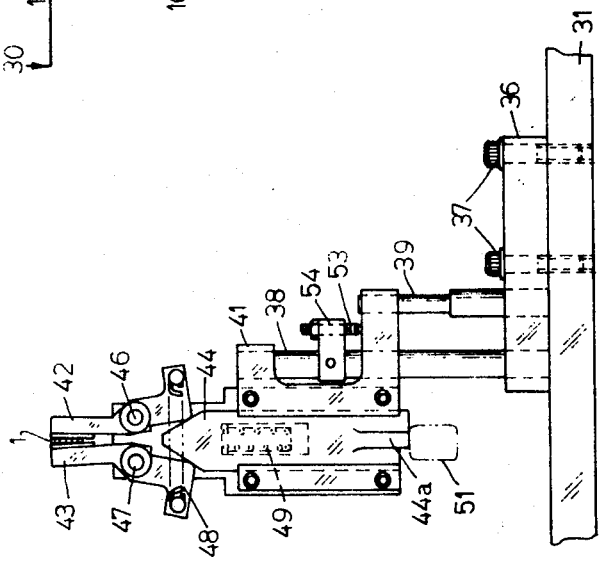
FIG. 12 is a view similar to FIG. 10 showing the ribbon holding unit in a raised position.

Fixedly secured to the hub 172 is a cam disc 179 which is contoured as shown in FIG. 14. A cam follower roller 181 in cooperative engagement with the disc 179 is mounted on an arm 182 which is secured to and extends rearwardly from the rock shaft 102 between the side wall 58 and the braclet 103 of the tool slide. The rock shaft 102 also carries the actuating arm 52 for the ribbon holding unit 33 and the actuating arm 101 for the ribbon clenching arms 93 and 94. Accordingly, when the shaft 157 starts to rotate in the direction of arrow A in FIG. 14, the arms 52 and 101 will start to rise. Initial rotation of the cam disc 179 from the starting position in which it is shown in FIG. 14 through an angle of about 35 degrees as indicated in the timing diagram FIG. 56, causes the ribbon holding unit 33 to be raised from the FIG. 10 position to the FIG. 12 position, and at the same time the ribbon clenching arms 93, 94 are caused to swing from their FIG. 11 position to their ribbon clenching position in which their conically recessed heads 93', 94' form the fiber gathering funnel 96 shown in FIG. 15. The ribbon holding unit 33 and the clenching arms then remain in their ribbon holding and ribbon clenching positions until the cam disc 179 has been rotated through an angle of about 130° from its starting position as indicated in the timing diagram FIG. 56. Continued rotation of the cam disc through another 35° (FIG. 56) then returns the ribbon holding unit 33 to its FIG. 10 position and the clenching arms 93, 94 to their FIG. 11 position, during the remainder of a full revolution (FIG. 56) of the cam disc 179 the ribbon holding unit stays in its FIG. 10 lowered position and the clenching arms stay in their FIG. 11 open position.

Referring next to the back and forth adjustment of the tool slide, this is accomplished by a shift mechanism which comprises two cam discs 183, 184 (FIG. 9) secured to the hub 176; a rocker assembly 186 (FIG. 16) which is pivotally mounted on a cross shaft 187 (FIG. 8) between the side walls 58, 59 of the tool slide; and a link 188 between the rocker assembly 186 and an anchor block 189 on the stationary base plate 31 of the ferrule attaching apparatus. The bottom plate 56 of the tool slide has a cut-out 191 accommodating the anchor block 189.

The rocker assembly 186 comprises a pair of parallel forward arms 192 (FIGS. 8 and 16) mounting a cam follower roller 193 in cooperative engagement with the cam disc 183. Another cam follower roller 196 in cooperative engagement with the cam disc 183 is mounted between parallel depending arms 193 of the rocker assembly 186. A pivot pin 197 connects the lower ends of the arms 193 with the forward end of the lin, 188; and a pivot pin 198 connects the rear end of the link 188 with the anchor block 186.

The cam discs 183 and 184 are shaped so that upon rotation of the shaft 157 in the direction of arrow A in FIG. 16, the foller 194 is kept in cooperative engagement with the contour of the disc 183 by cooperative engagement of the roller 196 with the contour of the disc 184, and vice versa.

In the condition of the apparatus as shown in FIG. 16, the tool slide is kept from moving forwardly from its projected position by contact of the roller 194 with the cam disc 183, and the tool slide is kept from moving backward by contact of the roller 196 with the cam disc 184.

Figure 56:
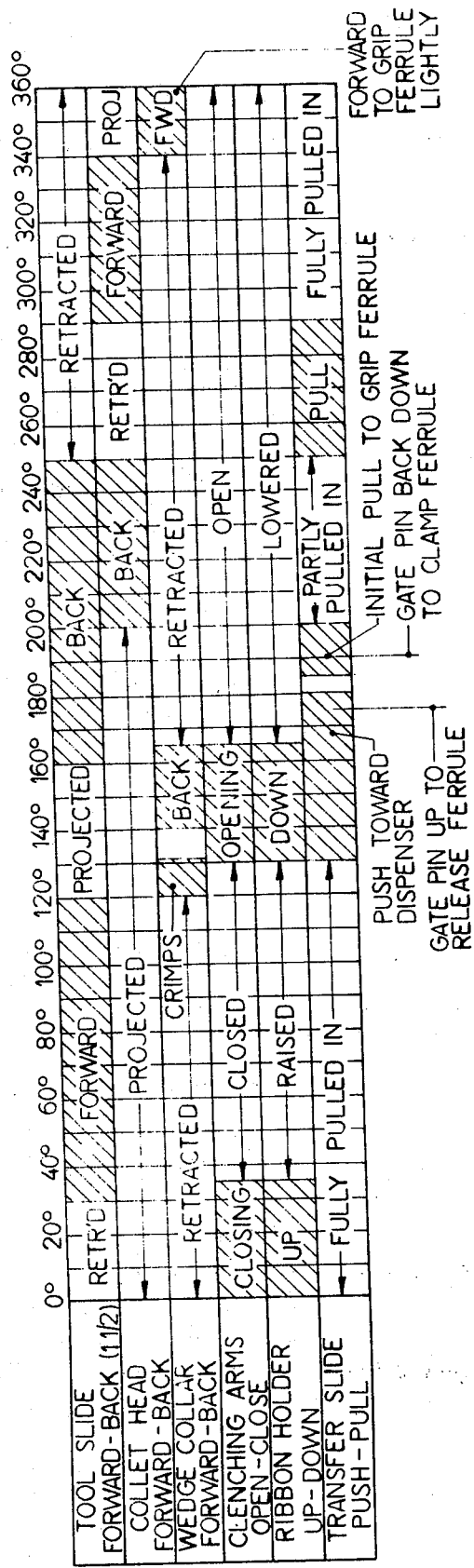
FIG 56 is a timing diagram depicting the several steps involved in the production of a fiber optical light conductor as illustrated by FIG. 5.

As indicated in the timing diagram FIG. 56, the tool slide stays in its retracted FIG. 14 position while the shaft 157 rotates through the first thirty degrees of a full revolution; that is, until the ribbon holder 33 has almost been fully raised and the clenching arms 93, 94 have almost been fully closed. Continued rotation of the shaft 157 through the next 90°, that is while its partial rotation through 120° from its starting position is being completed, and while the ribbon holder 33 remains in its raised position and the clenching arms 93, 94 remain closed as illustrated by FIG. 15, the tool slide is moved to its projected position in which it is shown in FIG. 16. This forward movement of the tool slide slips a ferrule over the free end of a ribbon which, as shown in FIGS. 16 and 17 is retained flatwise by a conveyor clamp 16 and by the raised ribbon holding unit 33.

Continued rotation of the shaft 157 through the next ninety degrees, that is while its partial rotation through 250° from its starting position is being completed, and shortly before the ribbon holding unit 33 has been fully lowered and the clenching arms 93, 94 have been fully opened, the tool slide is moved toward its retracted position in which it is shown in FIG. 19, and in which it stays while the shaft 157 rotates through the final 110 degrees of a full revolution.

Referring next to the back and forth adjustment of the collet head 70, 73, 74 relative to the front block 57 of the tool slide, this is accomplished by a shift mechanism which comprises two cam discs 199, 201 (FIG. 9) secured to the hub 174; a rocker assembly 202 (FIG. 19) which is pivotally mounted on the cross shaft 187; and the link 89 between the collet head yoke 84 and the rocker assembly 202.

The rocker assembly 202 comprises a pair of parallel forward arms 203 (FIGS. 8 and 19) mounting a cam follower roller 204 in cooperative engagement with the cam disc 199. Another cam follower roller 206 in cooperative engagement with the cam disc 201 is mounted between parallel depending arms 207 of the rocker assembly 202.

The rocker assembly 202 comprises a pair of parallel forward arms 203 (FIG. 8 and FIG. 19) mounting a cam follower roller 204 in cooperative engagement with the cam disc 199. Another cam follower roller 206 in cooperative engagement with the cam disc 201 is mounted between parallel depending arms 207 of the rocker assembly 202.

The cam discs 199, 201 are shaped so that upon rotation of the shaft 157 in the direction of arrow A in FIG. 19 the roller 206 is kept in cooperative engagement with the contour of the disc 201 by cooperative engagement of the roller 204 with the contour of the disc 199, and vice versa.

In the condition of the apparatus as shown in FIG. 19, the collet head yoke 84 is kept from moving forwardly from its retracted position by contact of the roller 204 with the cam disc 199, and the yoke 84 is kept from moving rearwardly from its retracted position by contact of the roller 206 with the cam disc 201.

As indicated in the timing diagram FIG. 56 the collet head stays in its projected FIG. 15 position while the shaft 157 rotates through the first 200 degrees of a full revolution. That allows the ribbon holder 33 to be raised, the clenching arms 93, 94 to be closed, and the tool slide to be advanced from its retracted to its projected position and again to be partly retracted, all with the collet head is in its projected position on the front block 57 of the tool slide. After the shaft 157 has been rotated 120 degrees from its starting position a hump 208 (FIG. 19) on the cam disc 201 engages the roller 206 of the rocker assembly 202. Continued rotation of the shaft 157 through an angle of about twelve degrees results in a forward thrust on the collet yoke 84 while the flange 76 of the collet supporting sleeve bears against the rear face of the front block 57 of the tool slide. Such forward thrust on the yoke 84 causes the wedge collar 73 to move forward within the sleeve 74, and as a reusult the metal sleeve 23 of a ferrule seated in the collet passage 71 will be crimped upon the plastic sleeve 22 of the ferrule as shown in FIG. 5. The crimping of the ferrule sleeve 23 firmly attaches the ferrule to the cylindrically gathered fibers therein, a short length of the fibers projecting from the free end of the ferrule as shown in FIG. 17.

As indicated in FIG. 56, the collet 70 remains contracted until the shaft 157 has been rotated 140° from its starting position. Thereafter, as the shaft 157 continues to rotate and the hump 208 clears the roller 206, the wedge collar receds slightly while the flange 76 of the collet supporting sleeve is urged against the rear face of the slide front block 57 by the spring loaded bolts 79. Withdrawal of the wedge collar 73 from its projected position within the sleeve 74 permits the collet 70 to expand, and to release the crimped ferrule in the collet passage 71.

After the shaft 157 has been rotated through the first 200 degrees of a full revolution, as indicated in FIG. 56, continued rotation of the shaft 157 through the next 50 degrees causes movement of the collet head from its FIG. 16 projected position to its FIG. 19 retracted position on the tool slide by cooperation of the cam disc 199 with the roller 204. Such retracting movement of the collet head, as indicated in FIG. 56, is accompanied by the final movement of the tool slide into its FIG. 19 retracted position.

The collet head stays in its retracted position on the retracted tool slide while the shaft 157 continues to rotate 40° after it has completed a 250° rotation from its starting position. During this dwell of the collet head in its retracted position on the retracted tool slide, a new ferrule is moved into alignment with the ferrule passage 71 of the collet by the transfer slide 109 as will be further discussed hereinbelow.

Continued rotation of the shaft 157 through an angle of 50° after it has been rotated 290° from its starting position as indicated in FIG. 56 causes forward movement of the collet head on the retracted tool slide by coaction of the cam disc 201 with the roller 206. Such forward movement of the collet head slips the expanded collet over a new ferrule presented to it by the transfer slide as illustrated by FIG. 35.

During the final 20° rotation of the shaft 157, the collet head stays in its projected position on the retracted tool slide, and the wedge collar 73 is urged forward a short distance to lightly grip the new ferrule in the collet passage 71.

Referring next to the push-pull movement of the transfer slide 109 on the front block 57 of the tool slide, this is accomplished by a shift mechanism which comprises two cam discs 209, 211 (FIG. 9) secured to the hub 173; a rocker assembly 212 which is pivotally mounted on the cross shaft 187 (FIG. 8) and the previously mentioned link 151 (FIG. 18), arm 149 (FIG. 13), shaft 146 (FIG. 15), arm 144 (FIG. 13) and link 147.

The rocker assembly 212 comprises the forwardly projecting arm 152 which is connected to the link 151 and mounts a cam follower roller 213 in cooperative engagement with the cam disc 211; and a depending arm 214 which mounts a cam follower roller 216 in cooperative engagement with the cam disc 209. The cam discs 209 and 211 are shaped so that upon rotation of the shaft 157 in the direction of the arrow A in FIG. 18 the roller 216 is kept in cooperative engagement with the contour of the disc 209 by cooperative engagement of the roller 213 with the contour of the cam disc 211, and vice versa.

As indicating in the timing diagram FIG. 56, the transfer slide 109 stays in its fully pulled in position (FIG. 11) while the shaft 157 rotates through the first 130 degrees of a full revolution. In that fully pulled in position of the transfer slide a ferrule seated in the passage 71 of the collet 70 is gripped by the notches 139, 141 (FIG. 13) of the bracket 133 and latch 134 under the pressure of the spring 137. After the ferrule has been crimped while the transfer slide is in its fully pulled in position, continued rotation of the shaft 157 through the next 50 degrees, pushes the transfer slide toward its fully pushed out position (FIG. 13) by coaction of the cam disc 211 with the roller 213. During such outward push the transfer slide disengages itself from the crimped ferrule in the collet 70, and as the transfer slide moves into its fully pushed out position (FIGS. 24 and 25) the gate pin 119 is lifted and a new ferrule slips into the gap between the dispenser housing 114 and the guard plate 126. Continued rotation of the shaft 157 through only a few degrees leaves the transfer slide in its fully pushed out position. During this short dwell period of the transfer slide a new ferrule slips from the dispenser housing 114 into axial abutment with the guard plate 116 (FIG. 25) while the collet head is in its projected position on the retracting tool slide.

Continued rotation of the shaft 157 through an angle of about 15° to an angle of 200° from its starting position brings the transfer slide 109 to its partly pulled in FIG. 20 position by coaction of the roller 216 with the cam disc 209. Such movement of the transfer slide brings the notches 139, 141 (FIG. 13) of the bracket 133 and latch 134 into gripping engagement with the new ferrule between its flanges 24 and 25 (FIG. 5). Also, during the movement of the transfer slide towards its partly pulled in FIG. 20 position, the gate pin 119 drops from its FIG. 25 ferrule releasing position to its FIG. 27 ferrule clamping position.

Continued rotation of the shaft 157 through 50° to a position of 250° from its starting position leaves the transfer slide in its partly pulled in FIG. 20 position. During this dwell of the transfer slide the collet head moves to its retracted position on the retracted tool slide, with the result that the gap between the dispenser housing 114 (FIG. 29) and the guard plate 126 is widened sufficiently to disengage the dispenser housing from the new ferrule which has been gripped by the transfer slide (FIG. 34). Also, as shown in FIGS. 29 and 33, withdrawal of the collet head and attached ferrule dispenser housing 114 to its retracted FIG. 33 position not only pulls the new ferrule out from under the spring loaded gate pin 119 but it also causes the gate pin to drop to the ferrule feed blocking position in which it is shown in FIGS. 29 and 33.

Continued rotation of the shaft 157 through the final 110 degrees of a full revolution first moves the transfer slide with the new ferrule thereon into the fully pulled in FIG. 11 position and then keeps it there while the collet head is projected on the retracted tool slide (FIG. 35) and then the tool slide is subsequently advanced to its FIG. 14 position.

In summary, rotation of the shaft 157 through a full 360 degrees turn produces the following sequence of operations:

a. the ribbon holding unit 33 is raised and the clenching arms 93, 94 are closed, as shown in FIG. 15;
    b. the tool slide 34 is advanced to thread the adjacent ribbon end through the ferrule, as shown in FIG. 16;
    c. the collet 70 is contracted to crimp the ferrule, as shown in FIG. 5;
    d. the ribbon holding unit 33 is lowered and the clenching arms 93, 94 are opened, as shown in FIG. 18;
    e. the transfer slide 109 is pushed out to disengage it from the crimped ferrule and to open the dispenser 111 as shown in FIGS. 13 and 25;
    f. the wedge collar 73 is retracted to release the crimped ferrule, as shown in FIG. 18;
    g. the tool slide 34 is moved to its retracted position, as shown in FIG. 14;
    h. the transfer slide is partly pulled in to grip a new ferrule, as shown in FIG. 20;
    i. the collet head and dispenser housing 114 are retracted to disengage a new ferrule from the dispenser 114, as shown in FIG. 29;
    j. the transfer slide is pulled in fully to align the new ferrule with the retracted collet, as shown in FIG. 34;
    k. the collet head is projected on the retracted tool slide to move over the new ferrule, as shown in FIG. 35; and
    l. the wedge collar 73 is advanced to contract collet and grip the new ferrule lightly.

In order to facilitate separation of the crimped ferrule from the expanded collet while the tool slide is being moved from its projected FIG. 18 position to its retracted position a blast of air is briefly admitted to the collet in a ferrule expelling direction. The air supply system for that purpose comprises an air passage control valve 217 (FIG. 15) mounted on the top plate 61 of the tool slide 34, a flexible conduit 218 connecting the valve 217 with a tubular insert 219 of the collet 70, and a pressure source (not shown) connected to the valve 217 by a conduit 221. An actuating arm 222 of the valve 217, extends into the range of movement of the rocker arm 149 and is arranged so that the valve opens when the arm 149 swings up, and closes the valve when the arm 159 swings down. Accordingly, the air blast into the collet 70 will be initiated upon movement of the transfer slide towards its pushed out FIG. 13 position and will continue for a short time so as to exert an ejecting pressure upon the crimped ferrule in the collet 70 while the tool slide 34 is on its way to the retracted position as indicated in FIG. 56.

In operation, the electric motor 156 is kept running at all times. The one-revolution clutch 171 (FIGS. 8 and 9) is of the conventional solenoid operated type and is normally in disengaged condition. An electrical energizing signal for the clutch 171 is derived from the ribbon measuring, cutting and conveying part 4 (FIG. 1) of the machine at the moment the conveyors 9 and 11 come to a stop. Such signal triggers the one-revolution clutch which then remains engaged for one full revolution of the shaft 157. Upon completion of the full revolution the clutch 171 disengages itself and the ferrule attaching apparatus is ready for a new cycle. The time required for the completion of an operating cycle of the ferrule attaching apparatus is relatively short, as for instance 1.2 seconds, and at any rate shorter than the minimum time interval at which the ribbon transfer conveyors 9 and 11 remain at a temporary standstill.

To insure stopping of the shaft 157 with the necessary degree of precision, a friction pad 223 (FIG. 7) engages a brake disc 224 on the shaft 157 so as to put a light drag on the torque transmitting mechanism between the motor 156 and the shaft 157.

Restart of the conveyors 9 and 11 after completion of a ferrule attaching operation brings the completed ribbon and ferrule assembly one step toward the collecting trough 3, and it also brings a new ribbon into alignment with the ferrule attaching apparatus 20. The next start of the conveyors 9 and 11 then brings the previously completed ribbon and ferrule assembly into lengthwise alignment with the ferrule trimming apparatus 30 which provides the ribbon with a plane light admitting and emitting end face 25 (FIG. 6) as will be explained hereinbelow with reference to FIGS. 36 through 55.

The foregoing explanations with respect to the ferrule attaching apparatus 20 analogously apply to the ferrule attaching apparatus 20a on the side frame 7 (FIG. 1).

THE FERRULE TRIMMING APPARATUS

The principal components of the ferrule trimming apparatus 30 are a stationary frame assembly 231 (FIG. 39) secured to the side frame 6 of the main frame (FIG. 1); a ferrule positioning mechanism 232 (FIG. 52) for releasably securing a crimped ferrule in a trimming position on the frame assembly 231; and a rotary cutting disc 233 (FIG. 38) for slicing an end portion from the crimped ferrule while it is retained by the ferrule positioning mechanism 232.

The frame assembly 231 comprises a rectangular bottom plate 234 (FIGS. 37 and 39) resting on top of and secured to the side channel 6 of the main frame; an end plate 236 (FIGS. 37 and 39) secured to the forward end of the bottom plate 234 opposite to the ribbon transfer conveyor 9; a first bracket plate 237 (FIGS. 36 and 37) secured to the bottom plate 234 in rear of and extending parallel to the front plate 236; and a second bracket plate 238 (FIGS. 38 and 39) secured to the bottom plate 234 in rear of and parallel to the first bracket plate 237.

Figure 36:
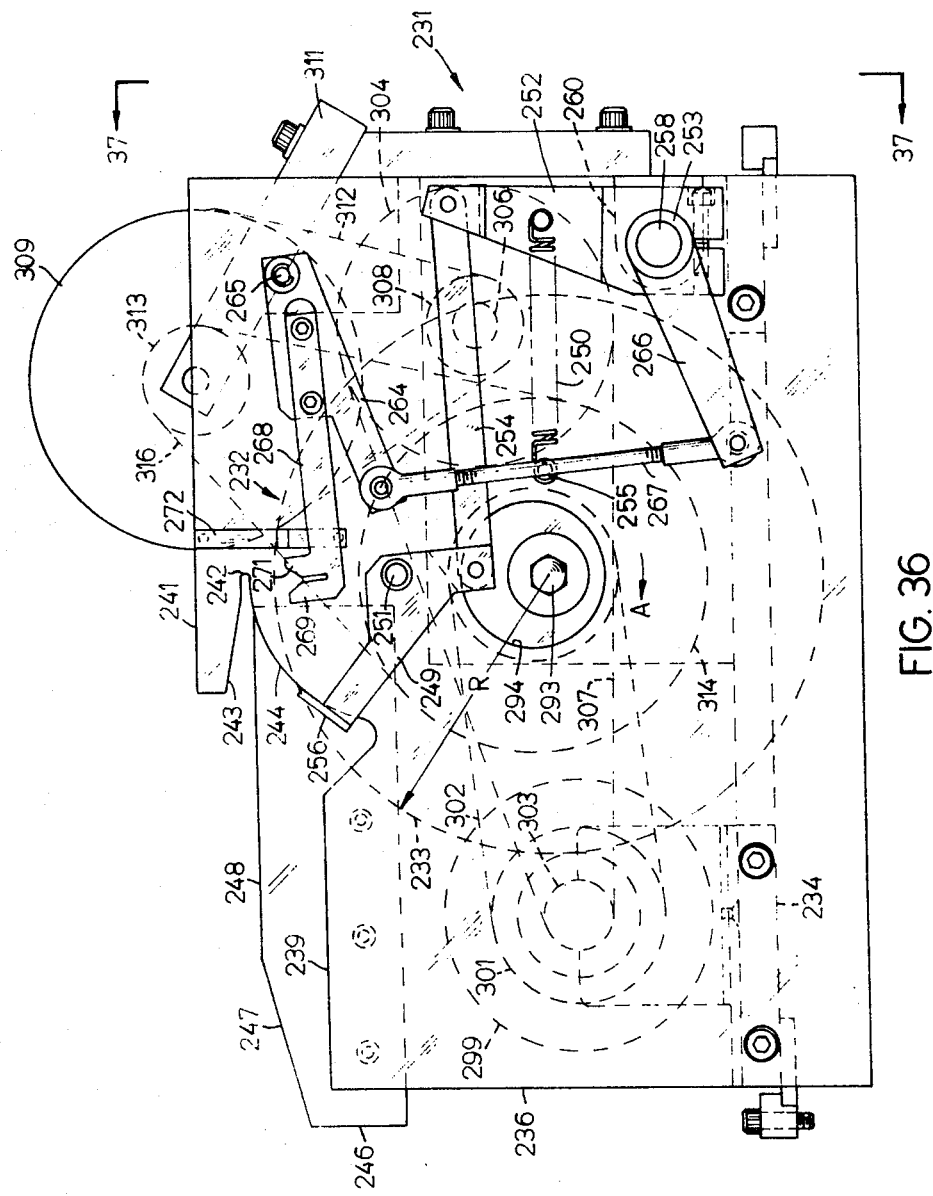
FIG. 36 is a sectional view on line 36—36 of FIG. 1 showing the forward side of a ferrule trimming apparatus.

The end plate 236, as shown in FIG. 36, has a lower horizontal top edge 239, an upper horizontal top edge 241, and a recess between the lower and upper edge portions 239 and 241 providing a ferrule seating notch 242 between re-entrant converging edge portions 243 and 244, the edge portion 243 slanting upwardly and the edge portion 244 convering downwardly away from the notch 242.

Fixedly secured to the rear side of the end plate 236 and extending upwardly beyond the horizontal top edge 239 and curved edge portions 244 is a relatively thin cam plate 246 presenting a downwardly slanting top edge portion 247 and a horizontal top edge portion 248 in alignment with the ferrule seating notch 242. In operation, the slanting edge portion 247 of the cam plate 246 is engaged by the ferrule of a ribbon-ferrule assembly which is moving into alignment with the trimming apparatus 30, and when the ribbon transfer conveyor 9 stops the ferrule will have moved to a position close to or in the ferrule seating notch 242.

The ferrule positioning mechanism 232 has two functions; one is to exert a radial seating pressure upon a ferrule which has been moved close to or into the seating notch 242 (FIG. 50) and the other is to exert an axial seating pressure upon a ferrule which is kept under radial seating pressure in the notch 242 (FIG. 53), the axial seating pressure urging the flange 28 (FIG. 5) of the ferrule against the forward side of the end plate 236.

Figure 47:
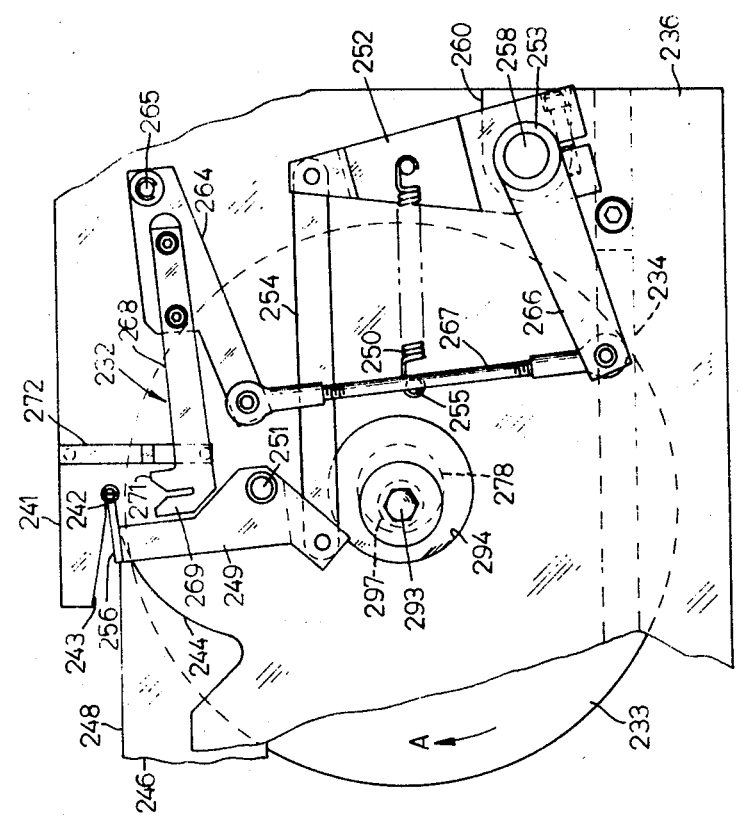
FIG. 47 is a partial view of the apparatus shown in FIG. 36 and illustrating a ferrule positioning mechanism in a ferrule seating condition.

A link and lever system for producing a radial ferrule seating pressure comprises a double armed lever 249 (FIG. 36) pivoted at the forward side of the end plate 236 on a pin 251; a rocker arm 252 secured at the forward slide of the end plate 236 to a rotatable hollow shaft 253; and a link 254 connecting the lower end of the lever 249 with the upper end of the rocker 252. At its free end the lever 249 has a small plate 256 which as shown in FIGS. 36 and 50 extends across the curved edge 244 of the end plate 236. The edge 244 is circular about the pivot pin 251, and swinging of the lever 249 in clockwise direction, as viewed in FIG. 36, brings the plate 256 to the ferrule engaging position in which it is shown in FIGS. 47 and 50.

Figure 44:
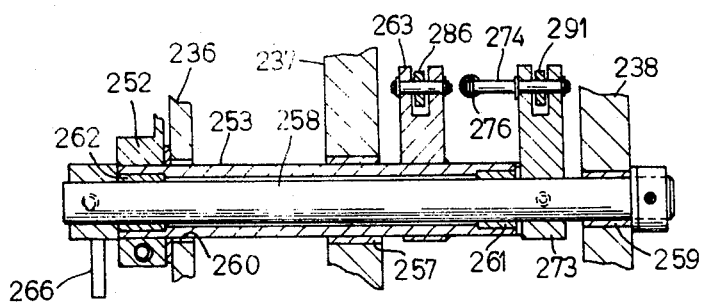
FIG. 44 is a section on line 44—44 of FIG. 39.

The hollow shaft 253, as shown in FIG. 44, is supported intermediate its ends on the bracket plate 237 by a bearing 257. A solid shaft 258 extends through the hollow shaft 253 and projects axially beyond both ends thereof. A bearing 259 supports the solid shaft 258 at one end on the bracket plate 238, and the opposite ends of the hollow shaft 253 are rotatably connected with the solid shaft 258 by bearings 261 and 262. A cutout 260 (FIG. 36) of the end plate 236 accommodates the hollow shaft 253. A hub of the rocker 252 is clamped to the forward end of the hollow shaft 253, and a rocker arm 263 (FIGS. 37, 44 and 45) is rigidly secured to the hollow shaft 253 between the bracket plates 237 and 238.

A tension spring 250 (FIG. 36) is hooked at one end to the arm 252 and at its other end to a pin 255 on the end plate 236. The tension of the spring 250 biases the lever 249 toward its ferrule engaging position in which it is shown in FIGS. 47, 48, 49 and 52. A cam operated mechanism to be described later is connected to the rocker arm 263 for causing back and forth swinging movement of the lever 249 between the ferrule clearing position in which it is shown in FIG. 36 and the ferrule engaging position in which it is shown in FIGS. 47, 48, 49 and 52.

Another link and lever system for producing the axial ferrule seating pressure comprises a lever 264 (FIG. 36) pivoted at the forward side of the end plate 236 on a pin 265; a rocker arm 266 secured at the forward side of the end plate 236 to the solid shaft 258; and a link 267 connecting the rocker arm 266 with the lever 264. A blade extension 268 of the lever 264 has a bifurcated end portion presenting ferrule engaging prongs 269 and 271.

As shown in FIGS. 49 and 50, the blade extension 268 is deflected away from the end plate 236 by a vertical spacer strap 272 (FIGS. 49 and 54) which is secured to the forward side of the end plate 236. As shown in FIG. 54, the spacer strap 272 has a relatively thick lower end portion and a relatively thin upper end portion, the proximate ends of the upper and lower strap portions being joined by an upwardly and rearwardly slanging shoulder 273. In the condition of the ferrule positioning mechanism as shown in FIGS. 49, 50 and 51, the lever 249 is in its raised ferrule seating position and the blade extension 268 is in its lowered ferrule clearing position. Upward swinging of the lever 264 into the position in which it is shown in FIG. 52 causes the blade extension 268 to move from the thick lower end portion of the spacer strap 272 beyond the shoulder 273 with the result that the spring bias of the blade extension 268 urges the prongs 269, 271 axially against the flange 24 (FIG. 5) of the ferrule and the flange 28 of the ferrule is pressed against the forward side of the end plate 236.

Fixedly secured to the solid shaft 258 (FIG. 44) between the bracket plates 237 and 238 is a rocker arm 273 which has a cross pin 274 at its outer end. A tension spring 276 (FIG. 46) is hooked at one end to the pin 274 and at the other end to an angle bracket 277 which is bolted to the bottom plate 234 of the trimmer frame. The tension of the spring 276 biases the lever 264 toward its lowered ferrule clearing position in which it is shown in FIG. 36.

Figure 39:
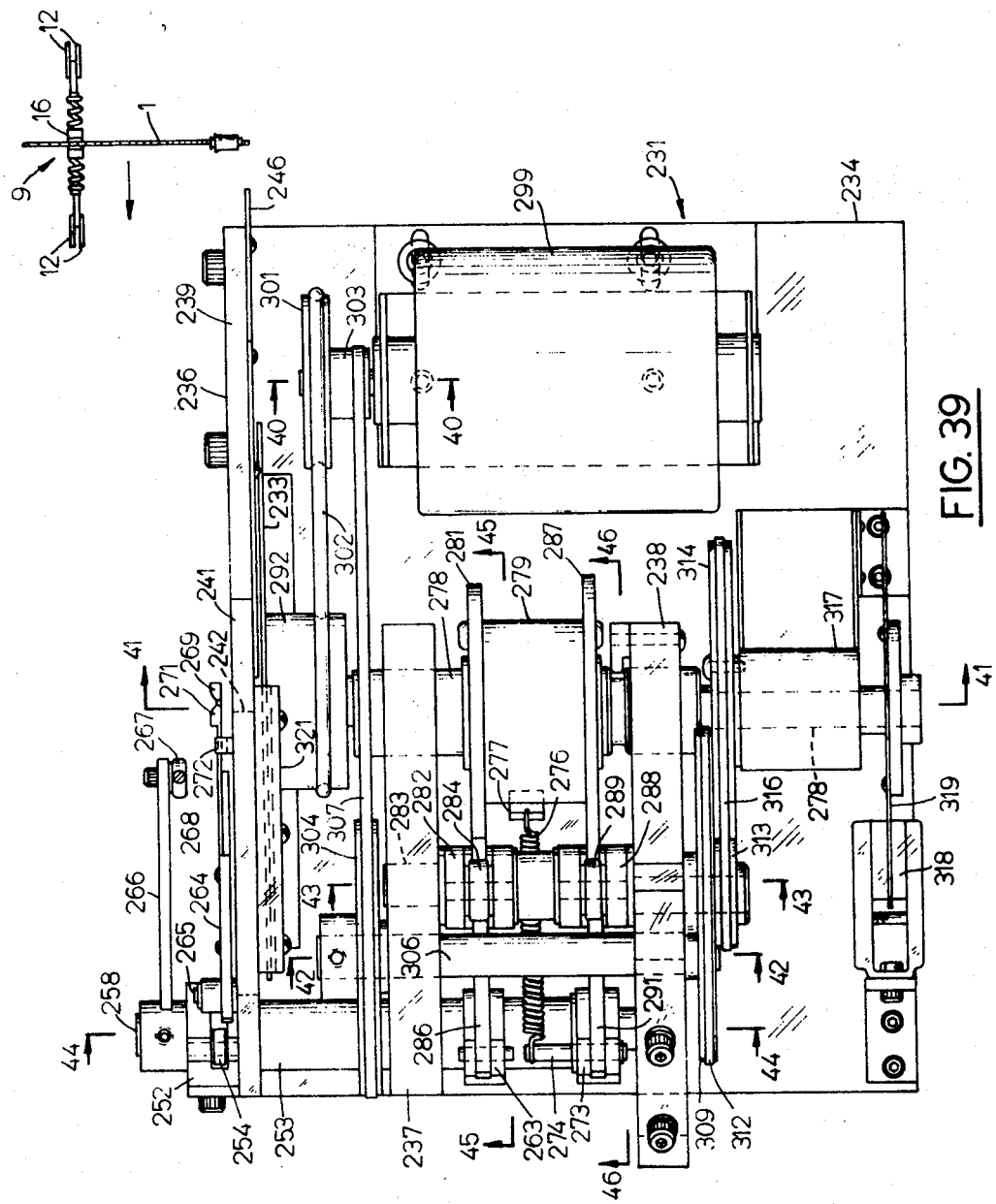
FIG. 39 is a top view of the apparatus shown in FIG. 36, 37 and 38.
Figure 40:
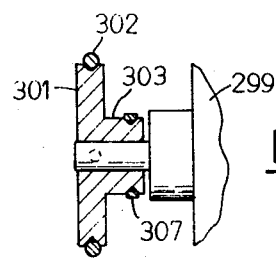
FIG. 40 is a section on line 40—40 of FIG. 39.
Figure 41:
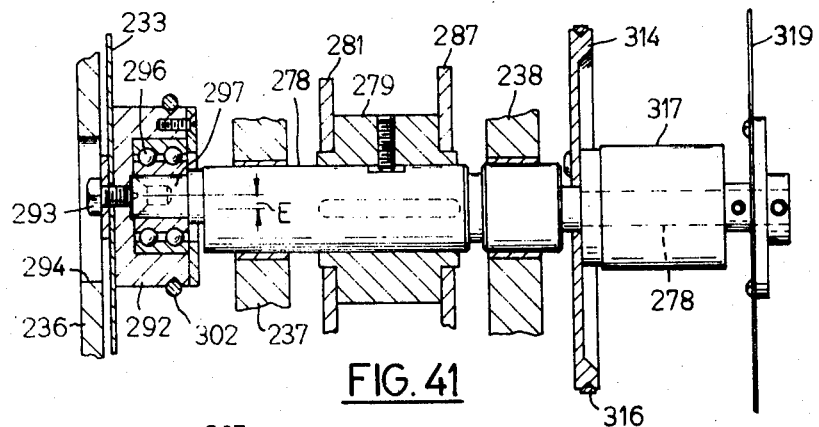
FIG. 41 is a section on line 41—41 of FIG. 39.
Figure 42:
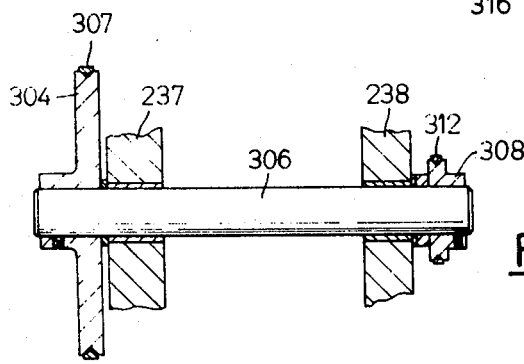
FIG. 42 is a section on line 42—42 of FIG. 39.
Figure 43:
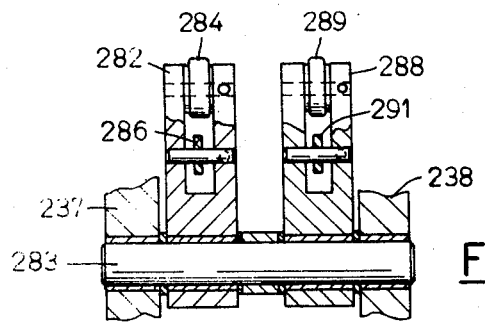
FIG. 43 is a section on line 43—43 of FIG. 39.
Figure 45:
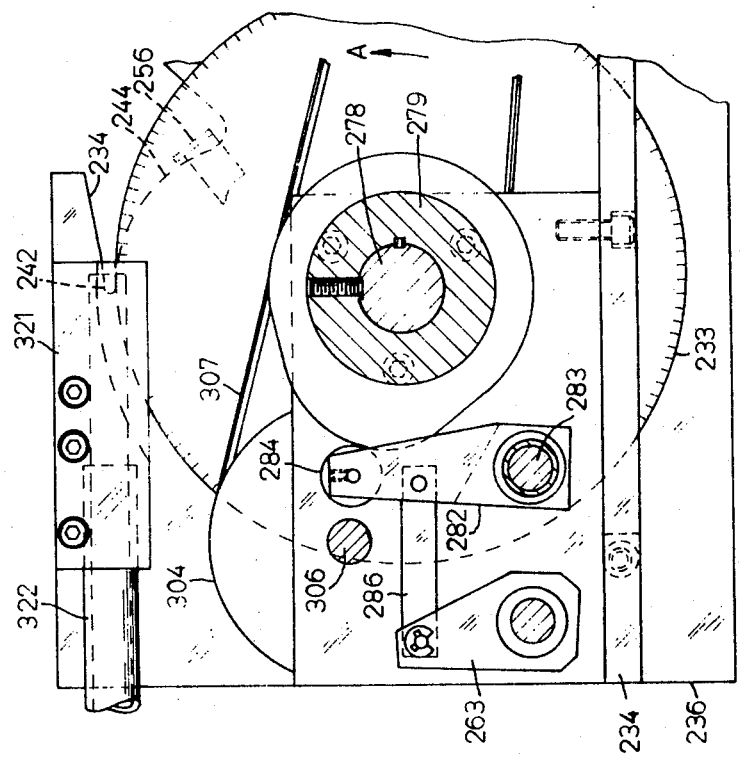
FIG. 45 is an enlarged partial section on line 45—45 of FIG. 39.

Referring to FIGS. 39, 41 and 45, the mechanism for rocking the hollow shaft 253 so as to swing the lever 249 into and out of its ferrule engaging position comprises a cross shaft 278 rotatably supported in the bracket plates 237, 238; a hub 279 secured to the shaft 278; a cam disc 281 (FIG. 45) secured to the hub 279; a rocker arm 282 pivoted on a shaft 283 (FIG. 43 between the bracket plates 237, 238 and carrying a cam follower roller 284; and a connecting link 286 between the rocker arms 263 and 282. In the condition of the mechanism as shown in FIG. 45, contact of the roller 284 with the cam disc 281 prevents the lever 249 from swinging into its ferrule engaging position under the tension of the spring 250. As the roller 284 follows the contour of the cam disc 281 during rotation of the shaft 278 through one complete revolution the lever 249 swings rapidly into its ferrule engaging position, then stays there during the greater part of the revolution, and during the final part of the revolution the lever 249 returns to its ferrule disengaged position.

Figure 46:
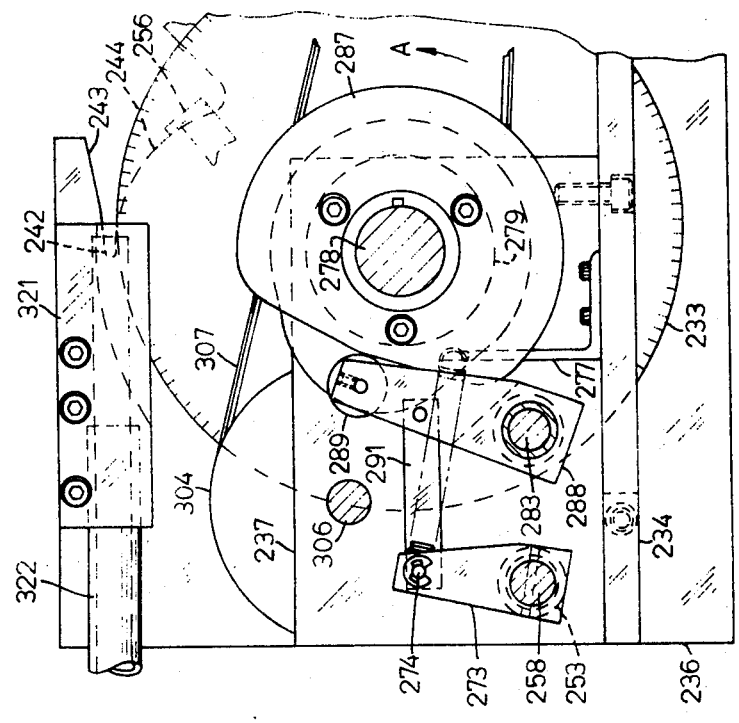
FIG. 46 is an enlarged, partial section on line 46—46 of FIG. 39.

The mechanism for rocking the solid shaft 258 so as to swing the lever 264 into and out of its ferrule engaging position comprises a cam disc 287 (FIG. 46) secured to the hub 279; a rocker arm 228 (FIG. 46) pivoted on the shaft 283 and carrying a cam follower roller 289; and a connecting link 291 between the rocker arms 273 and 288. In the position of the mechanism as shown in FIG. 46, the spring 276 urges the roller 289 against the cam disc 287 and thereby places the lever 264 into its ferrule disengaged position. As the roller 289 follows the contour of the cam disc 287 during rotation of the shaft 278 through one complete revolution the lever 264 swings rapidly into its ferrule engaging position, then stays there during the greater part of the revolution, and during the final part of the revolution the lever 264 returns to its ferruled disengaged position.

The cam discs 281 and 287 are shaped and secured to the hub 279 in rotatively adjusted positions so that upon rotation of the shaft 278 from the starting position shown in FIGS. 45 and 46, a ferrule in the notch 242 will first be radially engaged by the plate 256 on the lever 249 and then axially by the prongs 269, 271 of the blade extension 268 of the lever 264. Such sequential engagement of the ferrule by the plate 256 and the prongs 269 and 271 insures proper seating of the ferrule in the notch 242 while it is being trimmed by the cutting disc 233.

Figure 38:
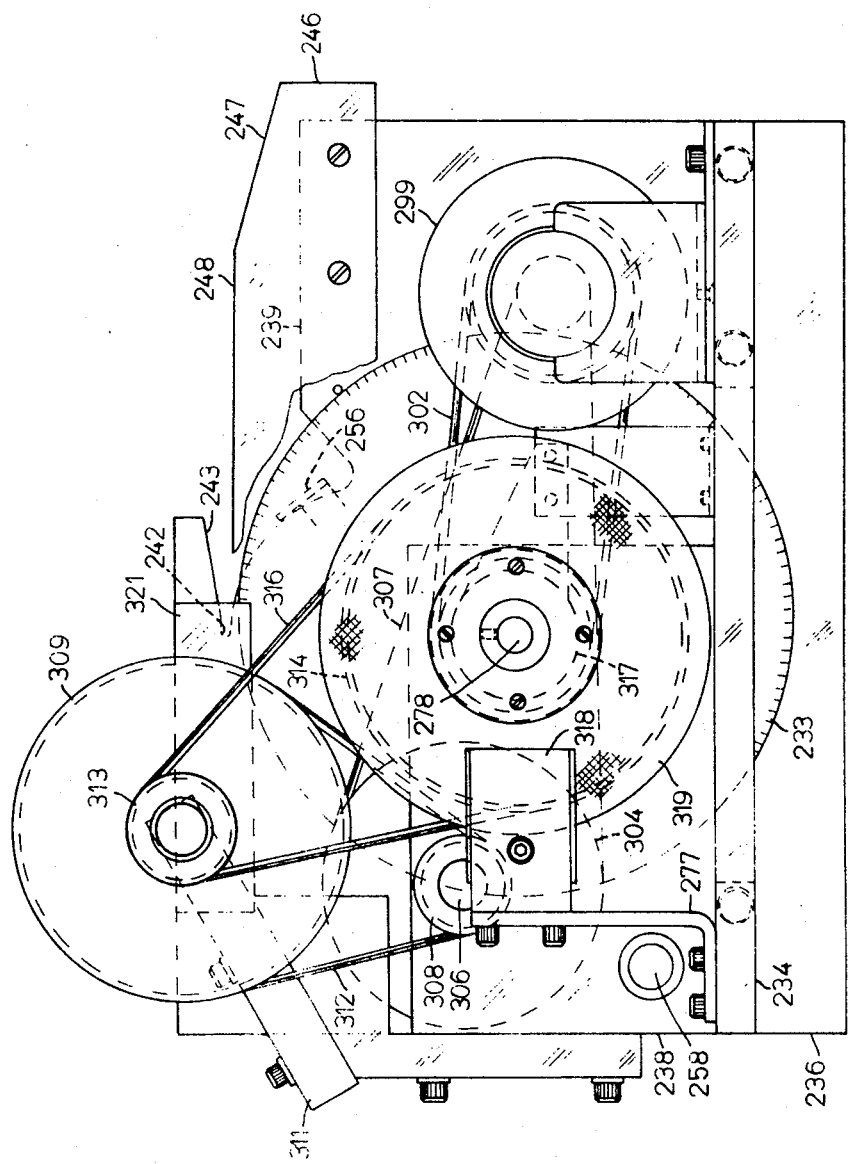
FIG. 38 is an elevational view on lines 38—38 of FIG. 37.

Referring to FIGS. 38 and 50, the cutting disc 233 for trimming a ferrule seated in the notch 242 of the end plate 236 is mounted in back of the end plate at a short axial distance therefrom. As shown in FIG. 41 the cutting disc 233 is secured at its center to a cup shaped cylindrical hub 292 by a cap screw 293 the head of which is accommodated by a large circular opening 294 of the end plate 236. A double row ball bearing 296 supports the hub 292 on an eccentric journal 297 at the forward end of the cross shaft 278. The eccentricity of the journal 297, that is, the radial spacing E between its axis and the axis of the shaft 278 causes orbital movement of the discs 233 relative to the end plate 236 upon rotation of the shaft 278 on its axis.

The cam hub 279 is secured to the shaft 278 in a rotatively adjusted position relative to the journal 297 which places the lever 249 and 264 into their ferrule disengaged positions while the shaft 278 is in a rotatively adjusted position which places the axis of the journal 297 below the axis of the shaft 278 as shown in FIG. 36. In the condition of the mechanism as shown in FIG. 36, the vertical distance from the center of the disc to the notch 242 is greater than the radius R of the disc, and the cutting edge of the disc therefore stays below a ferrule portion projecting rearwardly from the notch 242.

Rotation of the shaft 278 from the starting position in which it is shown in FIGS. 45 and 46 in the direction of arrow A through an angle of ninety degrees raises the axis of the journal 297 and the center of the disc 233 to the position shown in FIG. 47. Such raising of the journal and disc center shortens the distance from the disc center to the notch 242 to about the same length as the length of the disc radius R. In that condition of the mechanism, the ferrule is pressed radially into the notch 242, but the arm 264 has not yet been fully raised to its ferrule engaging position.

Figure 48:
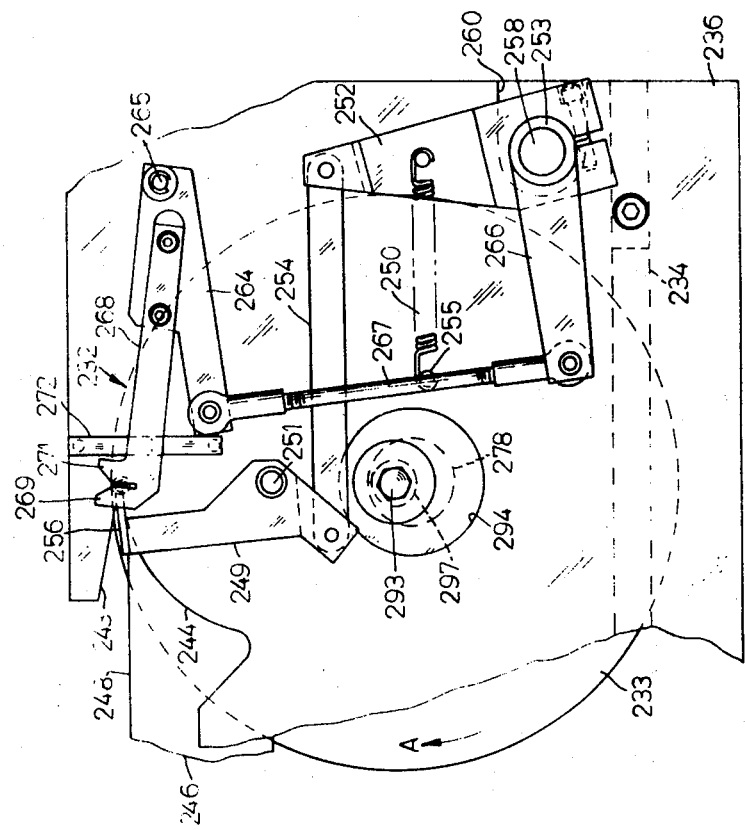
FIG. 48 is a view similar to FIG. 47 and illustrating the ferrule positioning apparatus in a ferrule seating and ferrule shifting condition.

Continued rotation of the shaft 278 through an angle of 180° from its starting position raises the axis of the journal 297 and the disc center to the top position shown in FIG. 48. During such raising of the journal and disc center the arm 264 swings into its ferrule engaging position and the cutting edge of the disc 233 moves past the notch 242.

Accordingly, will be explained in detail hereinbelow, the disc 233 is being rotated constantly during operation of the trimming apparatus. Accoringly, when the cutting edge of the disc is swept past the notch 242, a portion of a ferrule projecting rearwardly from the notch 242 will be sliced off by the rotating cutting disc as illustrated by FIG. 55 showing the cut-off waste piece 298. The remainder of the ribbon-ferrule assembly will then present a plane light admitting and emitting end face of the ribbon as indicated at 25 in FIGS. 6 and 6a.

Continued rotation of the shaft 278 after the cutting operation to complete one full revolution from the starting position restores the cutting disc 233 and the levers 249 and 264 to their starting positions in which they are shown in FIG. 36.

The ferrule trimming apparatus is powered by an electric motor 299 which is mounted on the bottom plate 234 as shown in FIGS. 38 and 39. Driving torque for the cutting disc 233 is transmitted from a pulley 301 on the motor shaft to the hub 292 on the eccentric journal of the shaft 278 by a belt 302. The belt is made of elastic material such as rubber which will accommodate the lengthening and shortening of the center spacing between the pulley 301 and the hub 292 during rotation of the shaft 278.

A speed reducing power transmitting mechanism between the motor 299 and the shaft 278 comprises a small diameter pulley 303 (FIG. 40) integral with the pulley 301; a large diameter pulley 304 secured to a counter shaft 306 (FIG. 42) and connected with the pulley 303 by a belt 307; a small diameter pulley 308 on the counter shaft 306; a large diameter pulley 309 mounted on a bracket 311 and connected with the pulley 306 by a belt 312; a small diameter pulley 313 integral with the pulley 309; a large diameter pulley 314 loose on the shaft 278 and connected with the pulley 313 by a belt 316; and a one-revolution clutch 317 operatively interposed between the pulley 314 and the shaft 278.

Figure 37:
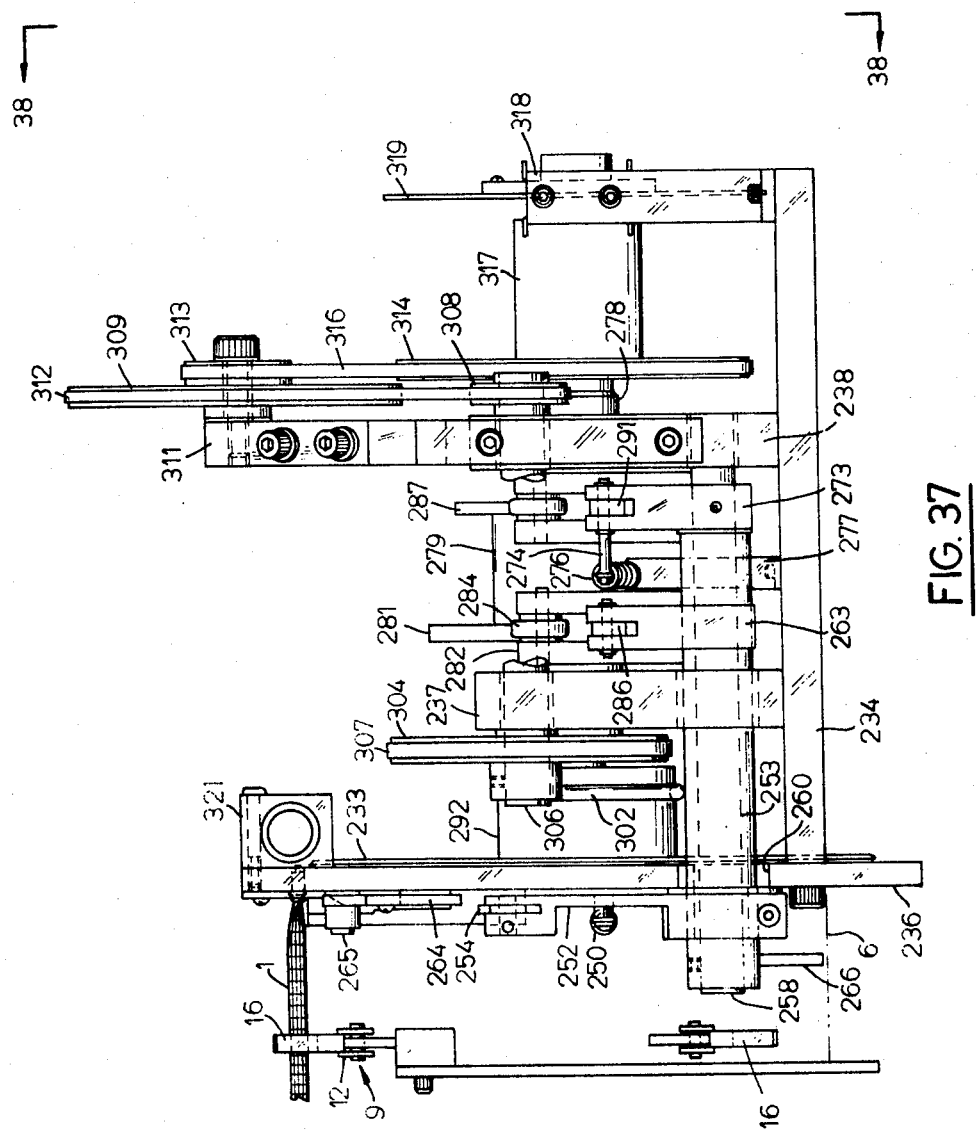
FIG. 37 is an elevational view on lines 37—37 of FIG. 36.

The counter shaft 306 which carries the pulleys 304 and 306 (FIG. 42) is rotatably mounted in the bracket plates 237, 348, and the bracket 311 which carries the pulleys 309 and 313 is bolted to the bracket plate 238 as shown in FIGS. 36 and 37. The one-revolution clutch 317, like the one-revolution clutch 171 (FIGS. 8 and 9) of the ferrule attaching apparatus, is of the conventional solenoid operated type.

The electrical signal which triggers the clutch 171 of the ferrule attaching apparatus 20 also triggers the clutch 317 of the ferrule trimming apparatus 30. Accordingly, while the apparatus 20 attaches a ferrule to a fiber optical ribbon during a short period of standstill of the conveyors 9 and 11, the trimming apparatus 30 trims the ferrule of a previously completed ribbon ferrule assembly.

To insure stopping of the shaft 278 with the necessary degree of precision upon completion of one full revolution, a friction pad 318 (FIG. 39) constantly engages a brake disc 319 on the shaft 278 so as to put a light drag on the torque tramsitting mechanism between the motor 299 and the shaft 278.

The waste piece 298 shown in FIG. 55 is disposed of by a vacuum operated conveying system including a receptacle 321 (FIG. 37) secured opposite to the notch 242 to the rear side of the end plate 236, and an exhaustor (not shown) connected to the receptacle 321 (FIG. 46) by a conduit 322.

As shown in FIG. 1, a ferrule trimming apparatus 30a is mounted on the side frame 7 opposite to the trimming apparatus 30 on the side frame 6. The apparatus 30a is an opposite hand uplicate of the apparatus 30, and the explanation hereinbefore with reference to the apparatus 30 analogously apply to the apparatus 30a.

The machine shown in FIG. 1 is capable to produce large quantities of fiber optical ribbons equipped with a ferrule at one or both ends, in rapid succession. The completed ribbon and ferrule assemblies accumulate in the collecting trough 3, and all that is necessary to sustain automatic production is to renew the ribbon supply reel 2 and to refill the ferrule supply hopper 112 as needed.

I claim:

1. The method of preparing a length of fiber optical ribbon for endwise light admission and emission, comprising, the steps of clamping said ribbon at a predetermined distance from one of its ends in an end-wise and laterally fixed position; clenching said ribbon at said one end thereof so as to gather its fibers into a light admitting and emitting cylindrical portion; pushing a plastic ferrule sleeve and a surrounding metallic ferrule sleeve over said cylindrical ribbon portion and thereby threading said clenched end of said ribbon through said plastic and metallic ferrule sleeves; crimping said metallic ferrule sleeve radially inward upon said plastic ferrule sleeve and thereby securing the latter to said cylindrical ribbon portion; and removing said ribbon from said fixed position.

2. The method set forth in claim 1 and further comprising the step of trimming the outer end of said plastic sleeve and cylindrical ribbon portion therein so as to provide said cylindrical ribbon portion with a plane, light admitting and emitting end face.

3. An apparatus for producing fiber optical light conductors comprising a stationary frame assembly, a pair of spaced apart conveyor means operable to move parallel, laterally spaced fiber optical ribbons sidewise step-by-step along said frame assembly, a ferrule attaching unit mounted on said frame assembly laterally of said conveyor means in cooperable relation thereto so as to produce ribbon and attached ferrule assemblies during periods of temporary standstill of said conveyor means; and a ferrule trimming unit spaced from said ferrule attaching unit in the direction of sidewise movement of said ribbons and mounted on said frame assembly in cooperative relation to said conveyor means so as to slice end portions from said ribbon and attached ferrule assemblies during said periods of temporary standstill of said conveyors means, and thereby provide each of said fiber optical ribbons with a plane light admitting and emitting end face.

4. An apparatus for producing fiber optical light conductors comprising a frame assembly; a pair of parallel, relatively spaced conveyors operable to support fiber optical ribbons extending therebetween in laterally spaced relation to each other and to advance said ribbons sidewise step-by-step along said frame; a pair of ferrule attaching units mounted on said frame assembly in laterally confronting relation, respectively, to said conveyors and in cooperable relation thereto so as to produce ribbon and attached ferrule assemblies having a ferrule at each end during periods of temporary standstill of said conveyors; and a pair of ferrule trimming units spaced from said ferrule attaching units in the direction of sidewise movement of said ribbons and mounted on said frame assembly in cooperative relation, respectively, to said conveyors so as to slice opposite end portions from said ribbon and attached ferrule assemblies during said periods of temporary standstill of said conveyors and thereby provide each of said fiber optical ribbons at both ends with a plane light admitting and emitting end face.

5. An apparatus for attaching ferrules to fiber optical ribbons comprising, a support; a ribbon holding unit mounted on said support for adjustment to ribbon engaging and releasing positions; a tool slide mounted on said support for reciprocating movement toward and away from said ribbon holding unit; actuating means operable to adjust said tool slide to projected and retracted positions relative to said ribbon holding unit; ferrule attaching means mounted on said tool slide and operable upon adjustment of the latter to said projected position to attach a ferrule to the end of a fiber optical ribbon held by said holding unit; and a ferrule feeding system mounted on said tool slide for supplying ferrules successively to said ferrule attaching means.

6. An apparatus as set forth in claim 5, wherein said ribbon holding unit comprises a clamp assembly mounted on said support for back and forth adjustment between a lowered ribbon releasing position and a raised ribbon holding position.

7. An apparatus as set forth in claim 6 and further comprising actuating means for said clamp assembly mounted on said tool slide and operatively interrelated with said tool slide actuating means so as to maintain said clamp assembly in said raised, ribbon holding position while said tool slide is advanced toward its projected position.

8. An apparatus as set forth in claim 5 and further comprising ribbon clenching means mounted on said tool slide between said ribbon holding unit and said ferrule attaching means for gathering the fibers of said ribbon at the end thereof next to said ferrule attaching means into a substantially cylindrical body by movement of said tool slide to its projected position.

9. An apparatus as set forth in claim 8, wherein said ribbon clenching means comprise a pair of arms mounted on said tool slide for swinging movement into and out of a ribbon clenching position, and actuating means for said ribbon clenching arms operatively interrelated with said tool slide actuating means so as to swing said clenching arms into said ribbon clenching position while said tool slide is in its retracted position, and so as to maintain said clenching arms in said clenching position while said tool slide is advanced toward said projected position.

10. An apparatus for attaching ferrules to fiber optical ribbons comprising, a support; a clamp assembly mounted on said support for back and forth adjustment between a lowered ribbon releasing position and a raised ribbon holding position; a tool slide mounted on said support for reciprocating movement toward and away from said clamp assembly; actuating means operable to adjust said tool slide to projected and retracted positions relative to said clamp assembly; a pair of ribbon clenching arms mounted on said tool slide for swinging movement into and out of a ribbon clenching position; actuating means for said clamp assembly and for said clenching arms operatively interrelated with said tool slide actuating means so as to maintain said clamp assembly in its lowered ribbon releasing position and said clenching arms out of their ribbon clenching position while said tool slide is in its retracted position, and so as to maintain said clamp assembly in its raised ribbon holding position and said clenching arms in their ribbon clenching position while said tool slide is advanced toward said projected position, and ferrule attaching means mounted on said tool slide and operable upon adjustment of the latter to said projected position to attach a ferrule to a fiber optical ribbon held by said clamp assembly and clenched by said clenching arms.

11. An apparatus as set forth in claim 5 wherein said ferrule attaching means comprise a collet head having an axially slotted, radially contractable and expandible ferrule crimping collet and a reciprocable wedge collar for contracting and expanding said collet; and actuating means for said wedge collar operatively interrelated with said tool slide actuating means so as to contract and expand said collet after said tool slide has been moved from its retracted to its projected position.

12. An apparatus as set forth in claim 11 wherein said collet head is slideably mounted on said tool slide for reciprocating movement between projected and retracted positions relative thereto, and shift means for said collet head operatively associated with said wedge collar actuating means.

13. An apparatus as set forth in claim 12 and further comprising means for admitting air pressure to said ferrule crimping collet in a ferrule expelling direction while said tool slide is moving toward its retracted position.

14. An apparatus as set forth in claim 5 wherein said ferrule feeding system comprises a ferrule dispensing mechanism on said tool slide; a ferrule transfer slide having ferrule gripping means; guide means mounting said transfer slide on said tool slide for back and forth movement so as to align said gripping means alternately with said dispensing mechanism and said ferrule attaching means; and actuating means for said transfer slide operatively interrelated with said tool slide actuating means so that said ferrule gripping means will be aligned with said ferrule attaching means while said tool slide is in its projected position, and so that said ferrule gripping means will be recipocated between said dispensing mechanism and said ferrule attaching means while said tool slide is in its retracted position.

15. An apparatus as set forth in claim 14 wherein said ferrule dispensing mechanism comprises a ferrule guide passage, a gate element spring biased transversely of said guide passage into a ferrule feed blocking position, and means operable by said transfer slide to adjust said gate element from said ferrule feed blocking to a ferrule feed establishing position, and vice versa.

16. A ferrule trimming apparatus comprising a frame having an upstanding end plate and a ferrule seating notch therein; ferrule positioning means operatively mounted on said frame for seating a ferrule in said notch and releasably retaining it therein in a laterally and axially fixed position; a cutting element; means mounting said cutting element on said frame for back and forth movement into and out of radial cutting relation to a ferrule portion projecting axially from said notch; and actuating means for said cutting element operatively interrelated with said ferrule positioning means so that cutting relation will be disestablished while said ferrule positioning means are in ferrule releasing condition, and so that said cutting relation will be established while said ferrule positioning means are in ferrule retaining condition.

17. A ferrule trimming apparatus as set forth in claim 16 wherein said ferrule positioning means comprise a first lever having a ferrule engaging end portion; pivot means mounting said first lever on said frame for swinging movement of said end portion into and out of radial engagement with a ferrule seated in said notch; a second lever mounted on said frame laterally of said end plate on a pivot axis extending transversely of said plate; a resilient arm on said second lever movable into and out of axial engagement with said ferrule; and actuating means for said levers successively operable to first bring said end portion of said first lever and then said resilient arm of said second lever into radial and axial engagement, respectively, with a ferrule in said notch.

18. A ferrule trimming apparatus as set forth in claim 16, wherein said cutting element comprises a circular disc having a peripheral cutting edge, and wherein said mounting means for said cutting element comprise a shaft rotatably mounted on said frame and having an eccentric journal; and bearing means rotatably mounting said disc on said journal.

19. A ferrule trimming apparatus as set forth in claim 18 and further comprising power transmitting means for rotating said disc mounting shaft including a constantly rotating drive element and a one-revolution clutch operable to connect said shaft with and disconnect it from said drive element.

20. A ferrule trimming apparatus as set forth in claim 18 and further comprising a rotary power source; a speed reducing power transmitting mechanism operatively interposed between said power source and said disc mounting shaft; and another power transmitting mechanism operatively interposed between said power source and said cutting disc; said speed reducing power transmitting mechanism including a constantly rotating drive element and a one-revolution clutch operatively interposed between said drive element and said shaft.

21. A ferrule trimming apparatus as set forth in claim 20 wherein said power transmitting mechanism between said power source and said cutting disc comprises a driving pulley on said power source, a driven pulley concentric with said cutting disc, and an elastic drive belt trained around said pulleys.

* * * * *